(12) United States Patent
Thiers

(10) Patent No.: US 8,771,477 B2
(45) Date of Patent: *Jul. 8, 2014

(54) LARGE-SCALE WATER PURIFICATION AND DESALINATION

(75) Inventor: Eugene Thiers, San Mateo, CA (US)

(73) Assignee: Sylvan Source, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/063,925

(22) PCT Filed: Sep. 17, 2009

(86) PCT No.: PCT/US2009/057277
§ 371 (c)(1),
(2), (4) Date: Jun. 1, 2011

(87) PCT Pub. No.: WO2010/033675
PCT Pub. Date: Mar. 25, 2010

(65) Prior Publication Data
US 2011/0226605 A1    Sep. 22, 2011

Related U.S. Application Data

(60) Provisional application No. 61/097,835, filed on Sep. 17, 2008.

(51) Int. Cl.
C02F 1/04       (2006.01)
C02F 1/20       (2006.01)
C02F 103/08     (2006.01)
C02F 101/10     (2006.01)
B01D 3/42       (2006.01)

(52) U.S. Cl.
USPC ............. 203/10; 202/160; 202/176; 202/197; 202/202; 203/2; 203/25; 203/27; 203/40; 203/DIG. 7; 203/DIG. 8; 203/DIG. 17; 203/DIG. 18; 210/710; 210/718; 210/768; 210/774

(58) Field of Classification Search
USPC ....... 159/46, DIG. 2; 202/160, 176, 197, 202; 203/2, 10, 25, 27, 40, 100, DIG. 7, 203/DIG. 8, DIG. 17, DIG. 18; 210/710, 718, 210/737, 741, 742, 744, 774, 766, 768; 95/257; 96/156, 173, 174
See application file for complete search history.

(56) References Cited

U.S. PATENT DOCUMENTS 3,350,279 A * 10/1967 Tolchin ......................... 202/83
3,901,768 A    8/1975  Steinbruchel
(Continued)

FOREIGN PATENT DOCUMENTS

JP    58-180281    10/1983
WO    WO 2005/056153    6/2005
(Continued)

OTHER PUBLICATIONS

PCT International Preliminary Report on Patentability in corresponding International application No. PCT/US2009/057277, mailed on Mar. 31, 2011, 9 pages.
U.S. Appl. No. 60/526,580, Thom, D, "Self-cleaning water processing apparatus," Dec. 2003.
U.S. Appl. No. 60/676,870, Toner, J, "Methods of administering rapamycin analogs with anti-inflammatories using medical devices," Oct. 2005.

(Continued)

*Primary Examiner* — Virginia Manoharan
(74) *Attorney, Agent, or Firm* — Davis Wright Tremaine LLP

(57) ABSTRACT

Embodiments of the invention provide systems and methods for water purification and desalination. The systems have a preheater, a degasser, multiple evaporation chambers with demisters, heat pipes, and a control system, wherein the control system permits continuous operation of the purification and desalination system without requiring user intervention or cleaning. The systems are capable of recovering hear from each distillation stage, while removing, from a contaminated water sample, a plurality of contaminants including: microbiological contaminants, radiological contaminants, metals, salts, and organics.

20 Claims, 18 Drawing Sheets

Double Distillation Configuration

(56) References Cited

U.S. PATENT DOCUMENTS

| | | | |
|---|---|---|---|
| 3,907,683 A * | 9/1975 | Gilmont | 202/177 |
| 3,935,077 A * | 1/1976 | Dennison | 202/83 |
| 4,081,331 A * | 3/1978 | Weiss | 202/181 |
| 4,342,623 A * | 8/1982 | Loeffler | 202/83 |
| 4,617,093 A * | 10/1986 | Hwang | 203/41 |
| 4,657,639 A * | 4/1987 | Mahadevan et al. | 202/182 |
| 4,698,136 A * | 10/1987 | El-Allawy | 203/11 |
| 4,818,344 A * | 4/1989 | Glucksman | 202/176 |
| 5,368,698 A * | 11/1994 | Field et al. | 202/180 |
| 6,113,860 A * | 9/2000 | Manninen | 422/528 |
| 6,635,150 B1 | 10/2003 | Le Goff | |
| 7,337,828 B2 * | 3/2008 | Lange | 165/104.21 |
| 7,678,235 B2 * | 3/2010 | Deep et al. | 202/160 |
| 8,371,251 B2 * | 2/2013 | Frick | 122/406.1 |
| 2003/0136747 A1 * | 7/2003 | Wood et al. | 210/774 |
| 2004/0168339 A1 * | 9/2004 | Roberts et al. | 34/218 |
| 2004/0251211 A1 * | 12/2004 | Suddath | 210/748 |
| 2007/0012556 A1 * | 1/2007 | Lum et al. | 203/10 |
| 2007/0068791 A1 | 3/2007 | Thom | |
| 2007/0084713 A1 * | 4/2007 | Deep et al. | 202/160 |
| 2009/0218210 A1 * | 9/2009 | Demmons et al. | 203/22 |

FOREIGN PATENT DOCUMENTS

| | | |
|---|---|---|
| WO | WO 2007/047443 | 4/2007 |
| WO | WO 2007/047674 | 4/2007 |
| WO | WO 2007/103117 | 9/2007 |
| WO | WO 2008/115578 | 9/2008 |

OTHER PUBLICATIONS

U.S. Appl. No. 60/697,104, Thiers, E, "Visual filter flow indicator," Jul. 2005.

U.S. Appl. No. 60/697,106, Thiers, E, "Apparatus for restoring the mineral content of drinking water," Jul. 2005.

U.S. Appl. No. 60/697,107, Lum, G, "Demister apparatus," Jul. 2005.

U.S. Appl. No. 60/727,106, Demmons, L, "Energy-efficient distillation system," Oct. 2005.

U.S. Environmental Protection Agency, "Methods for the Determination of Organic Compounds in Drinking Water," 1988 (Rev. 1991), EPA/600/4-88/039.

U.S. Environmental Protection Agency, "Methods for the Determination of Organic Compounds in Drinking Water Supplement I," 1990, EPA/600/4-90/020.

U.S. Environmental Protection Agency, "Methods for the Determination of Organic Compounds in Drinking Water Supplement II," 1992, EPA/600/R-92/129.

U.S. Environmental Protection Agency, "Methods for the Determination of Organic Compounds in Drinking Water Supplement III," 1995, EPA/600/R-95/131.

U.S. Environmental Protection Agency, "Method 1613: Tetra—Through OctaChlorinated Dioxins and Furans by Isotope Dilution HRGC/HRMS," 1994, EPA/821-B-94-005.

Office Action in corresponding Chinese application No. 200980145207.5, mailed on Aug. 9, 2013, 20 pages.

Office Action in corresponding Japanese application No. 2011-527072, mailed on Oct. 1, 2013, 3 pages.

* cited by examiner

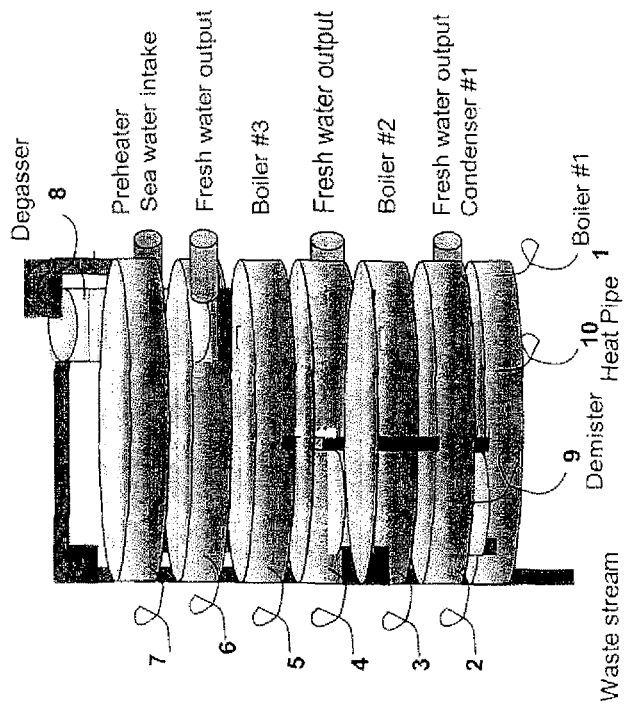
Figure 1-A: Double Distillation Configuration
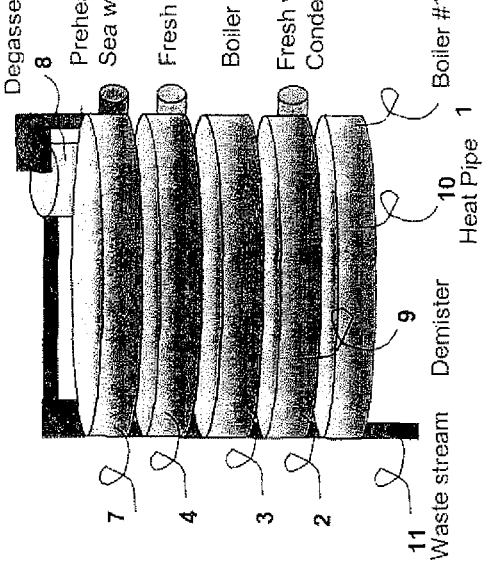
Figure 1-B: Triple Distillation Configuration

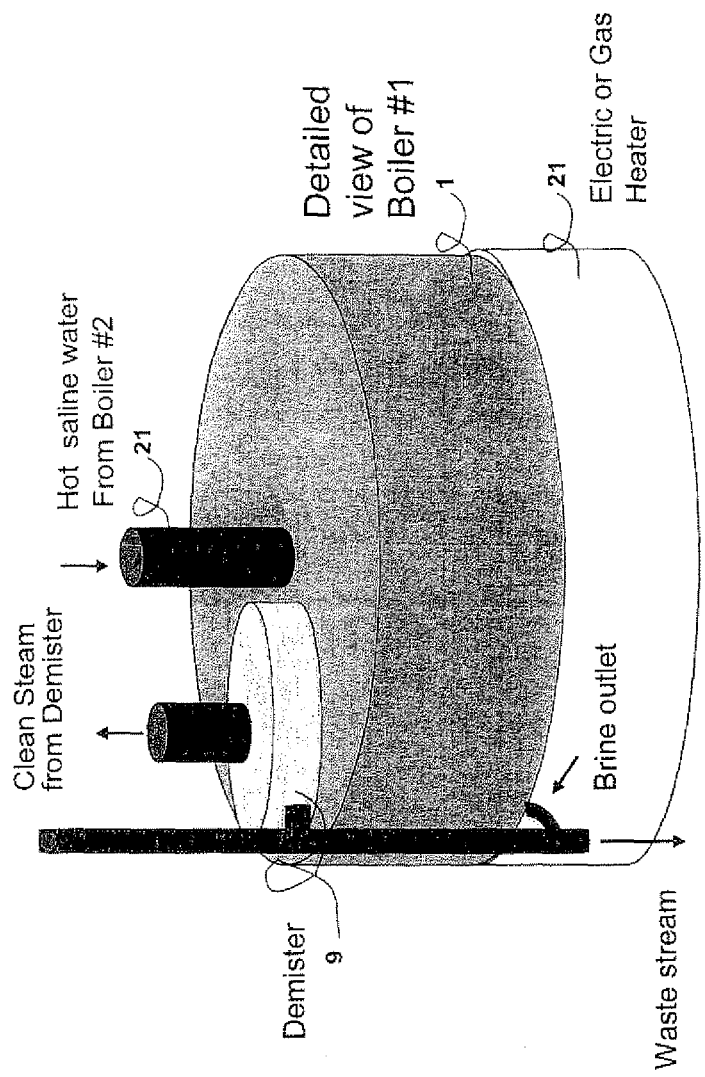
Figure 2—Schematic diagram of the bottom boiling chamber.

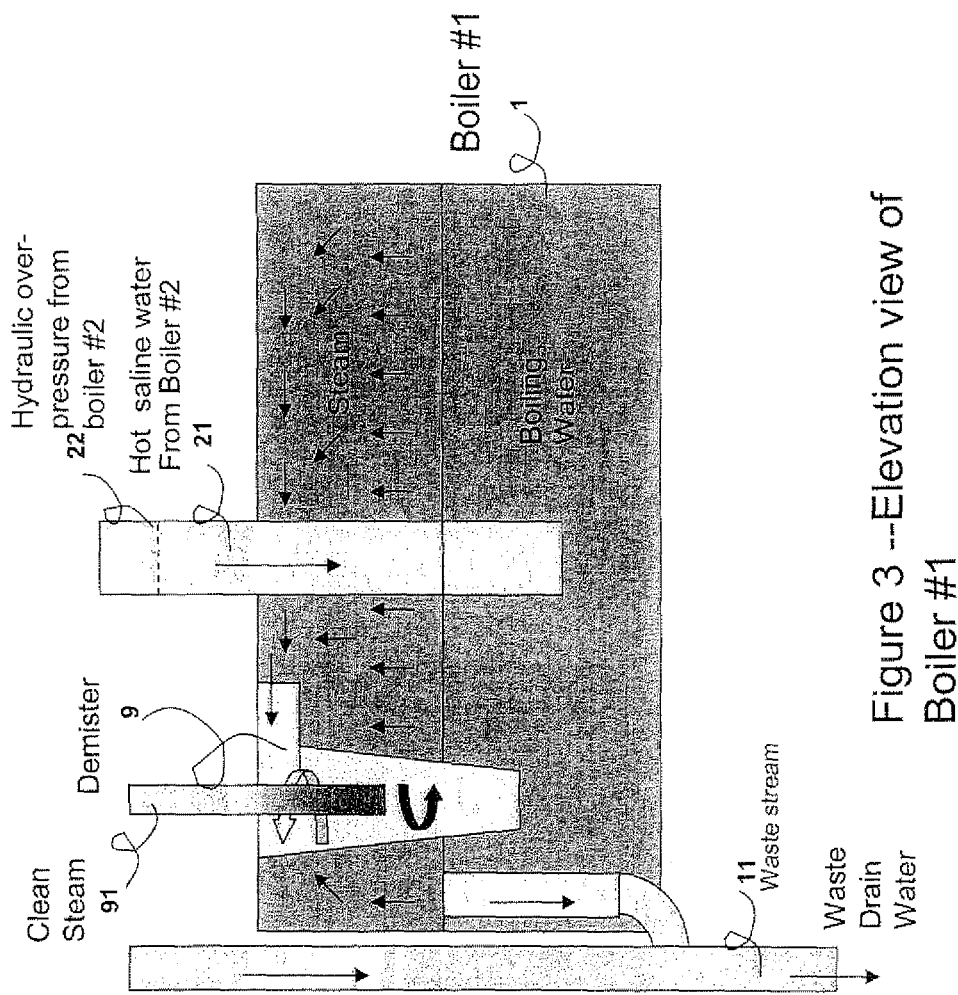
Figure 3 -- Elevation view of Boiler #1

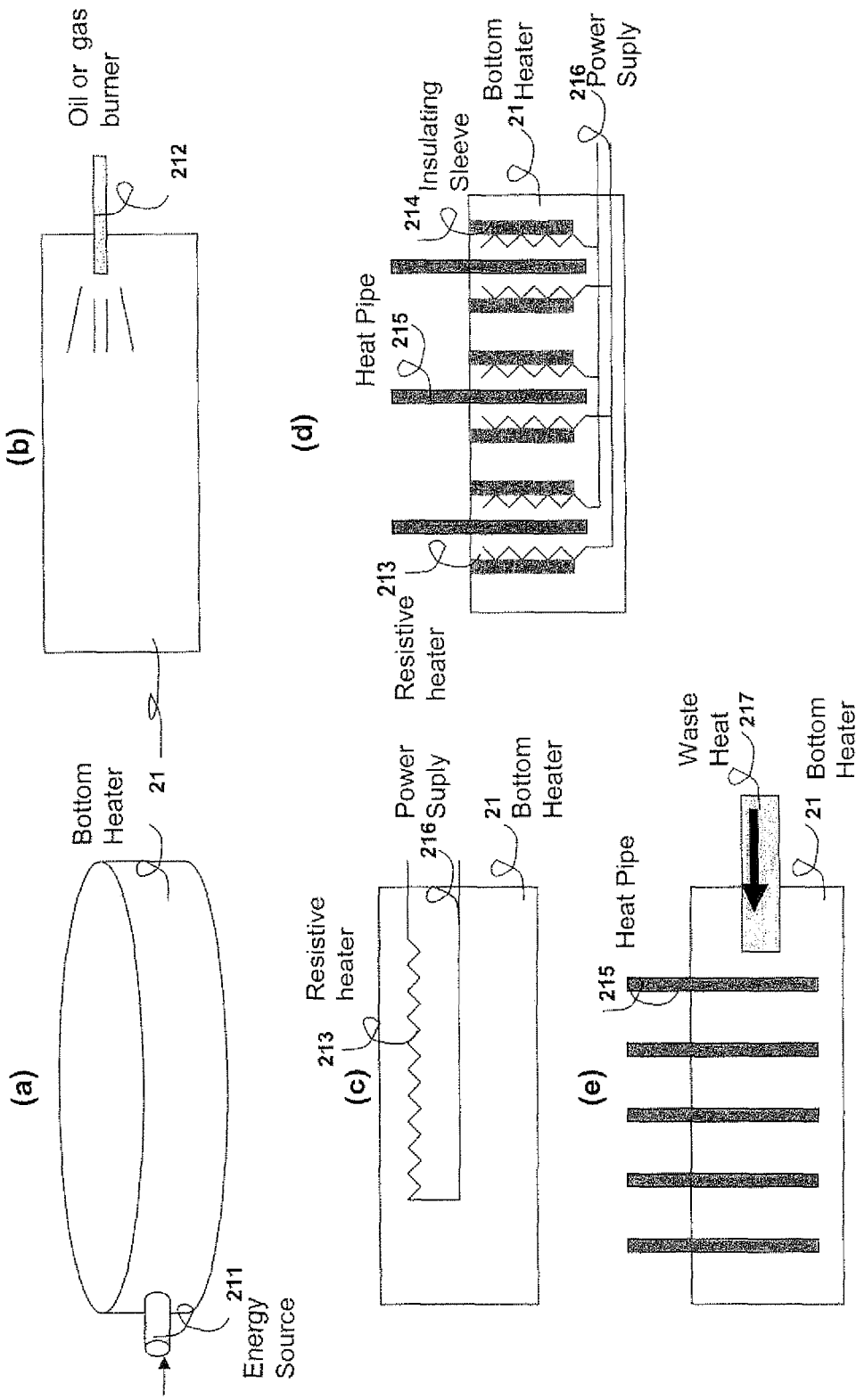
Figure 4 – Some Possible Heating Configurations

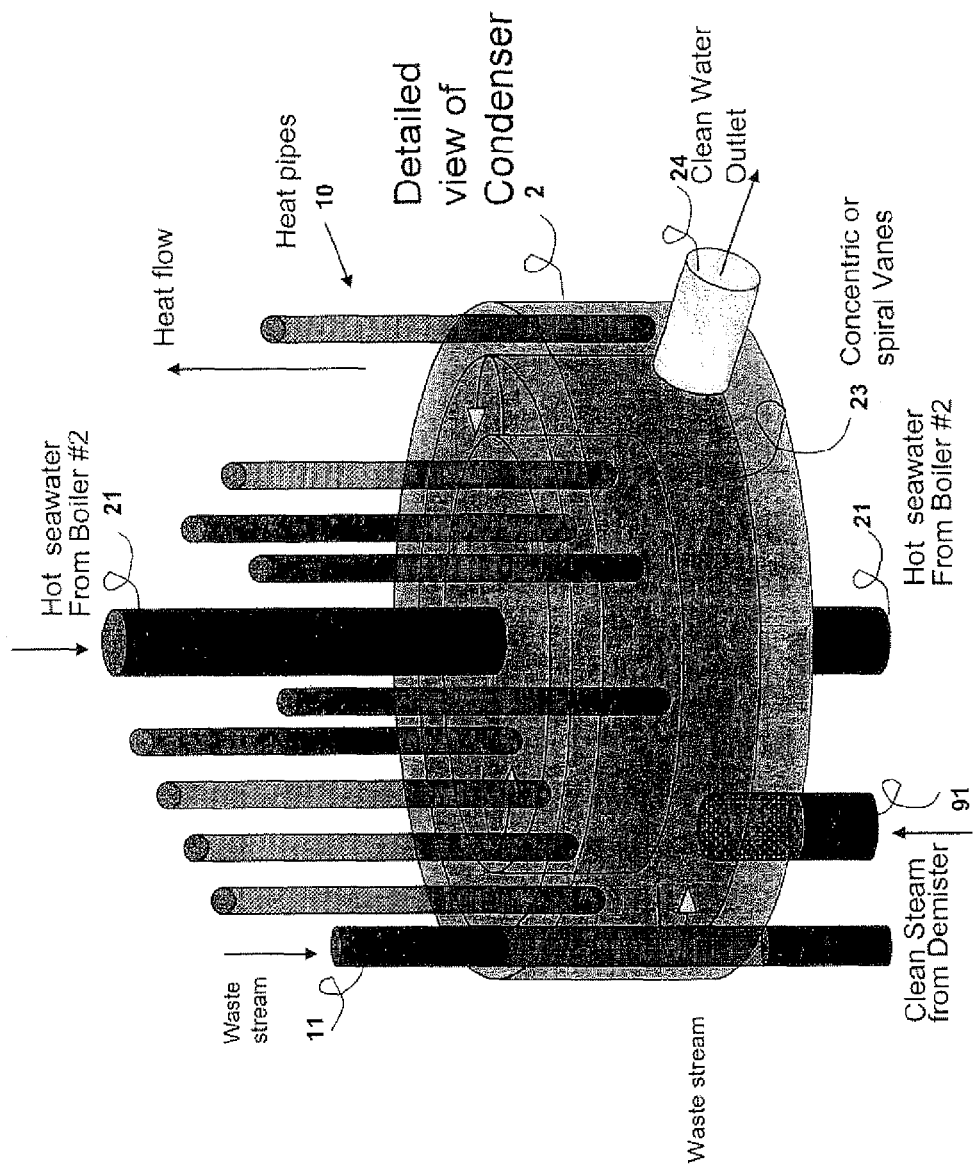
Figure 5—Schematic diagram of a condenser chamber

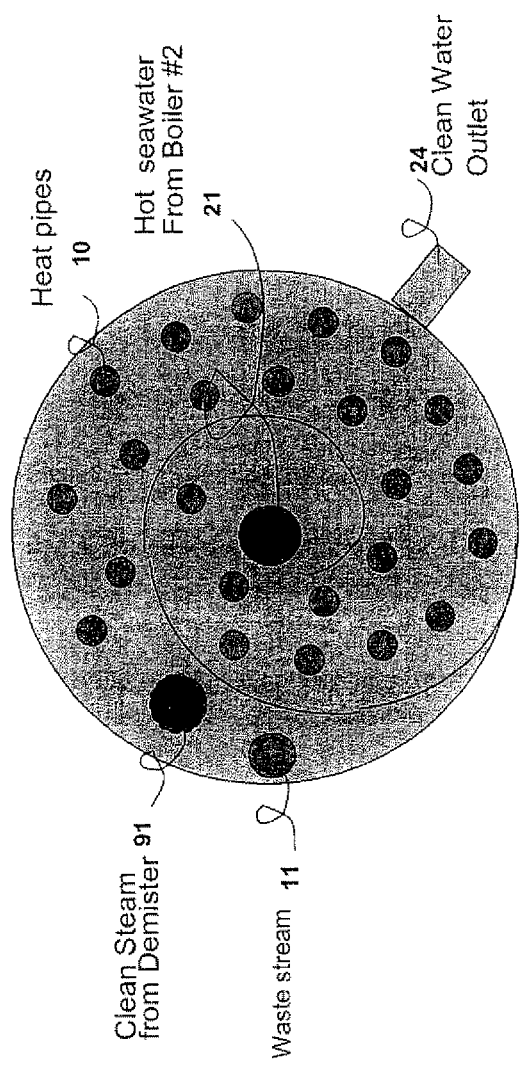
Figure 6 – Plant view of Condenser #1

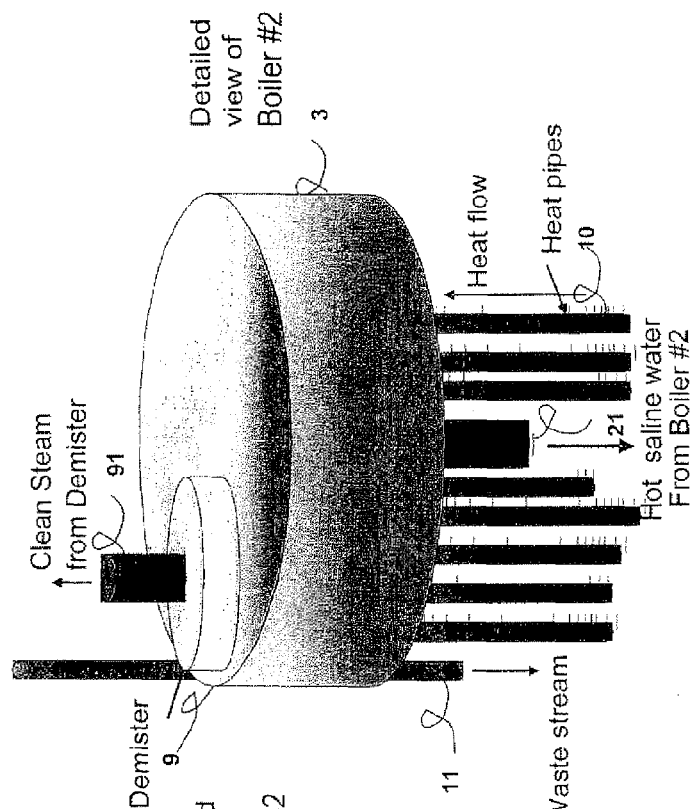
Figure 7-A: Schematic Diagram of Boiler for a Double Distillation Configuration
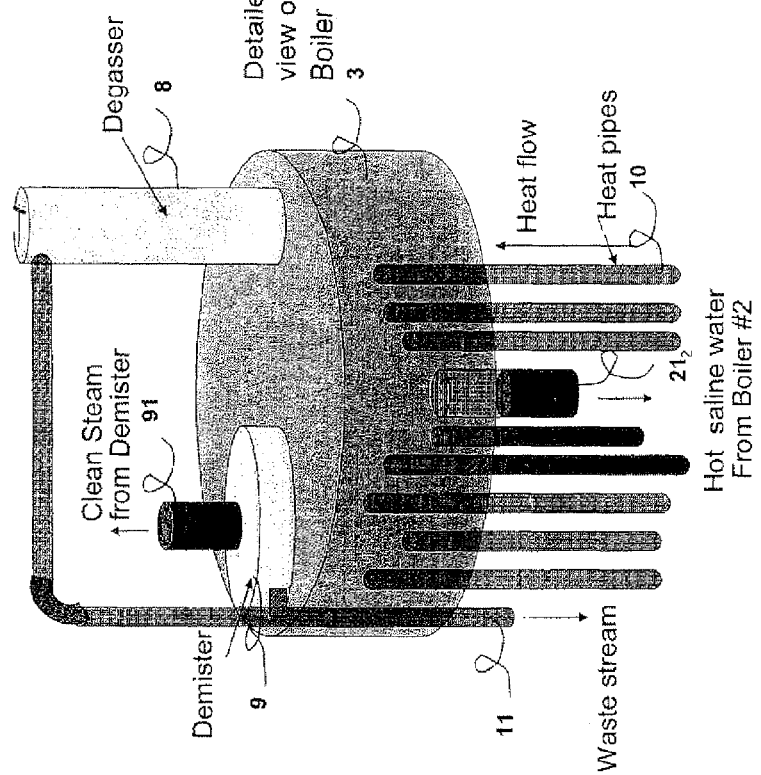
Figure 7-B: Schematic Diagram of Boiler for a Triple Distillation Configuration

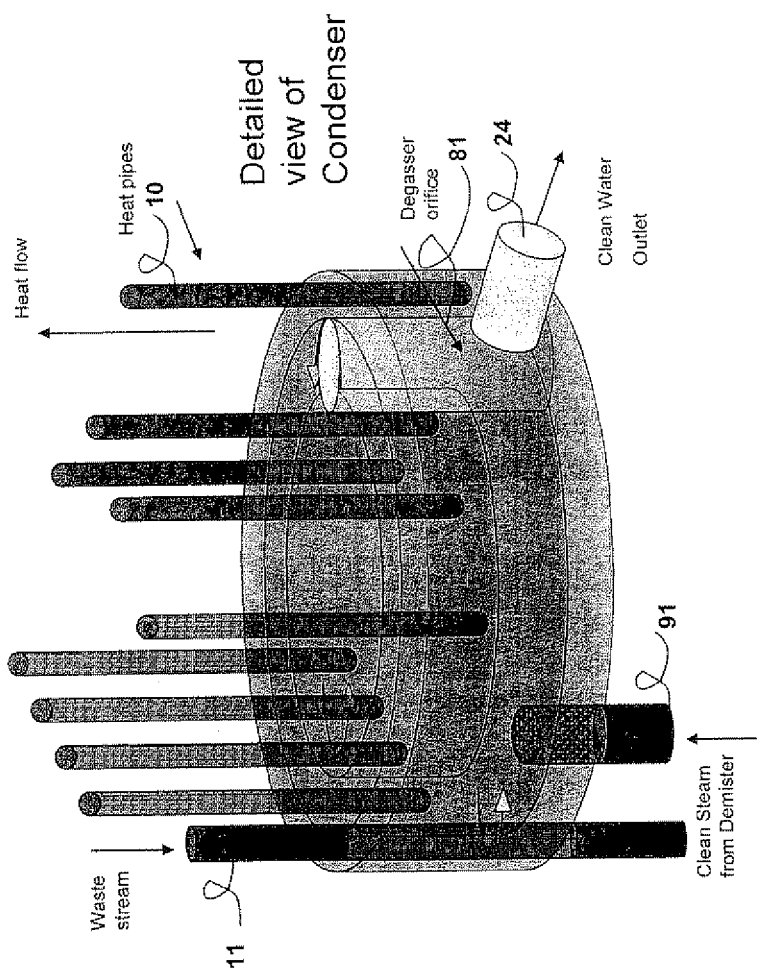
Figure 8—Schematic Diagram of a Condenser Chamber.

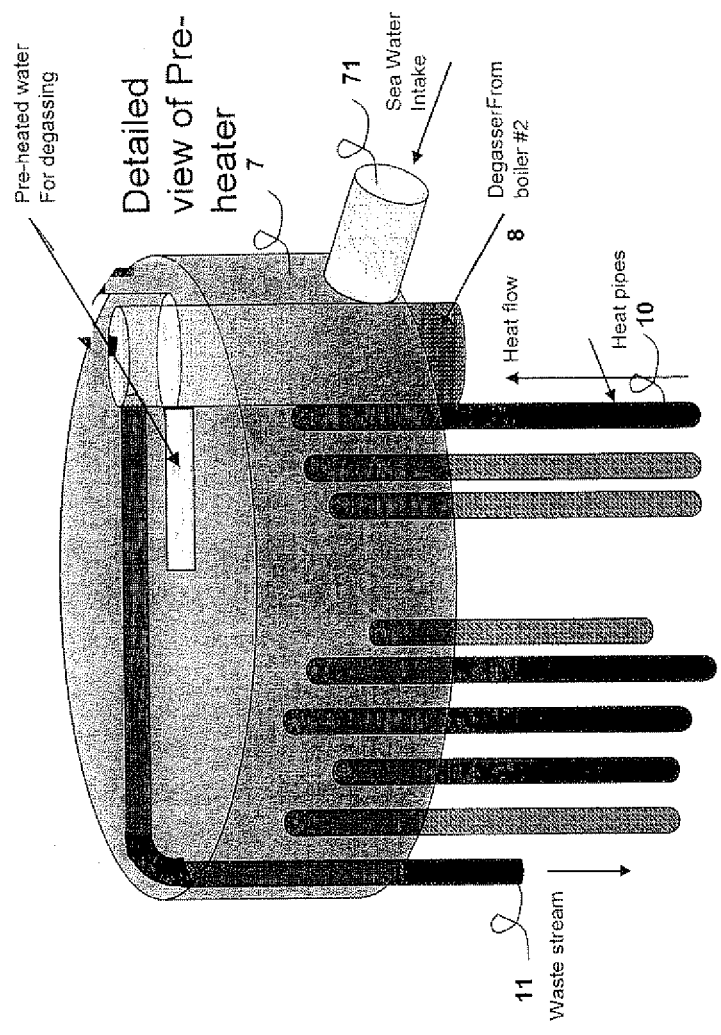
Figure 9—Schematic Diagram of a Pre-heating Chamber.

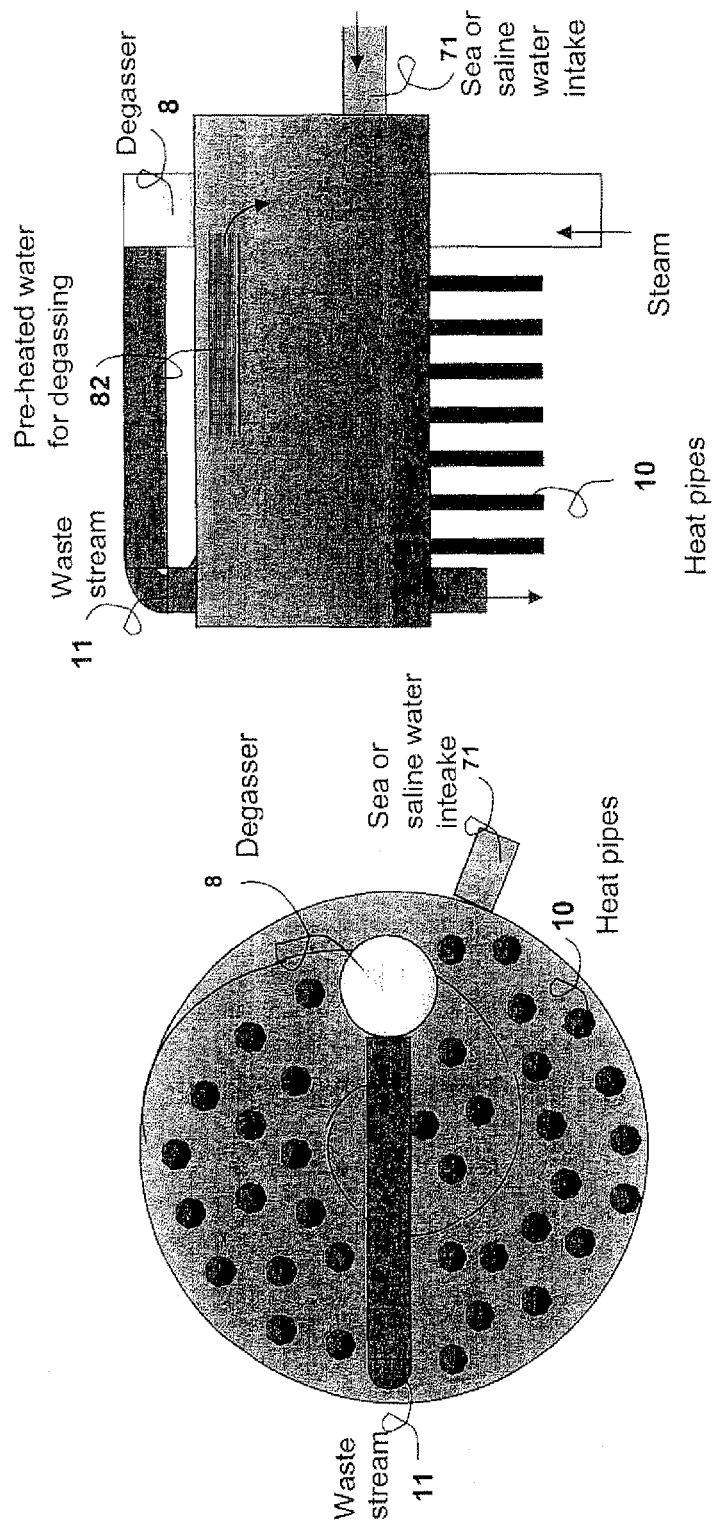
Figure 11 -- Elevation view of Pre-heater
Figure 10 -- Plant view of Pre-heater

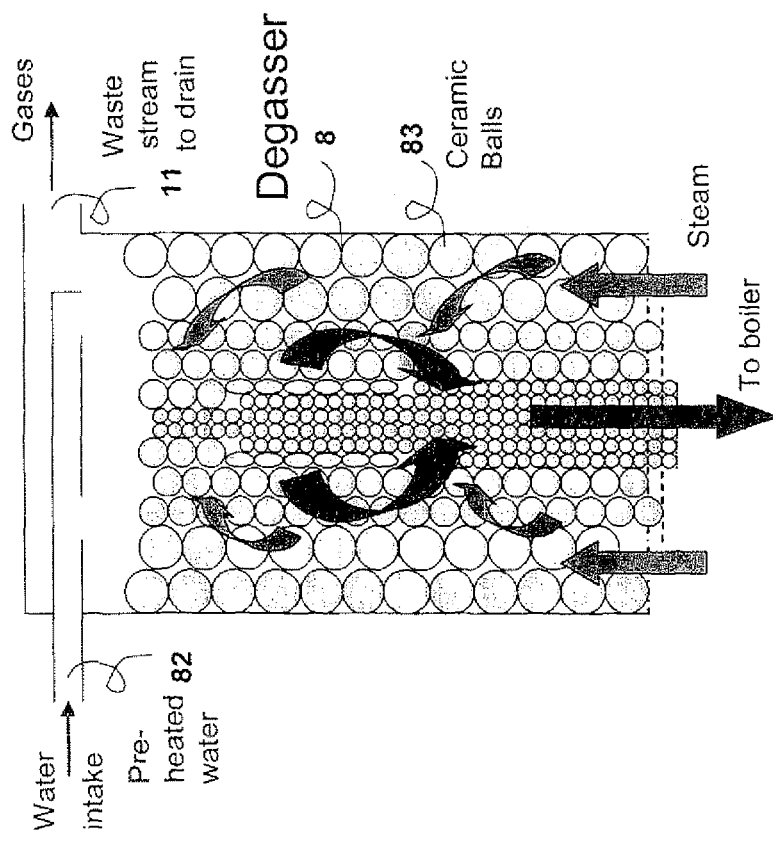
Figure 13—Elevation View of a Degasser
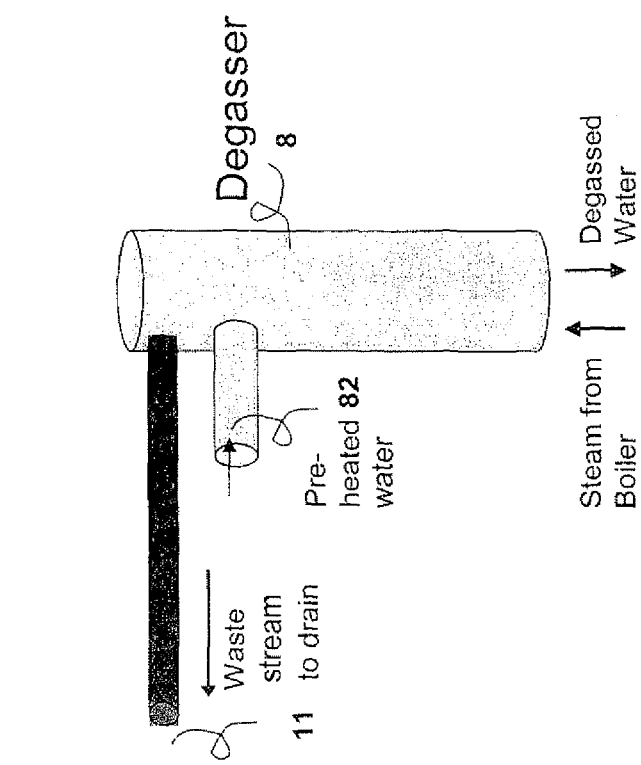
Figure 12—Schematic Diagram of a Degasser

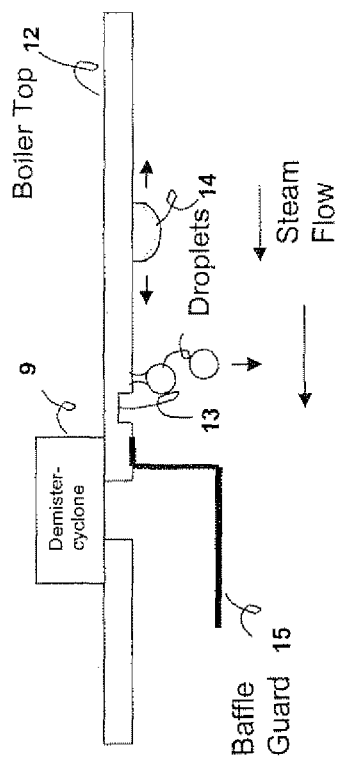
FIGURE 14 — DIAGRAM OF BAFFLE GUARD AND METAL GROOVE
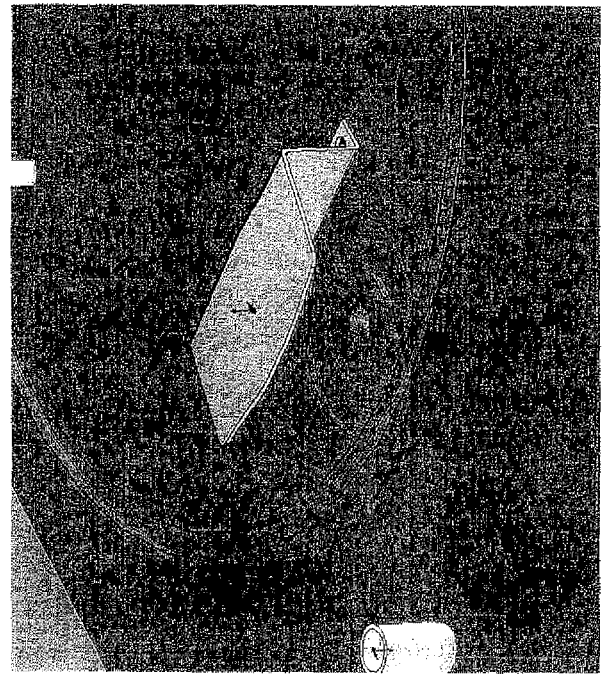
FIGURE 15 — PICTURE OF BAFFLE GUARD ON BOILER COVER

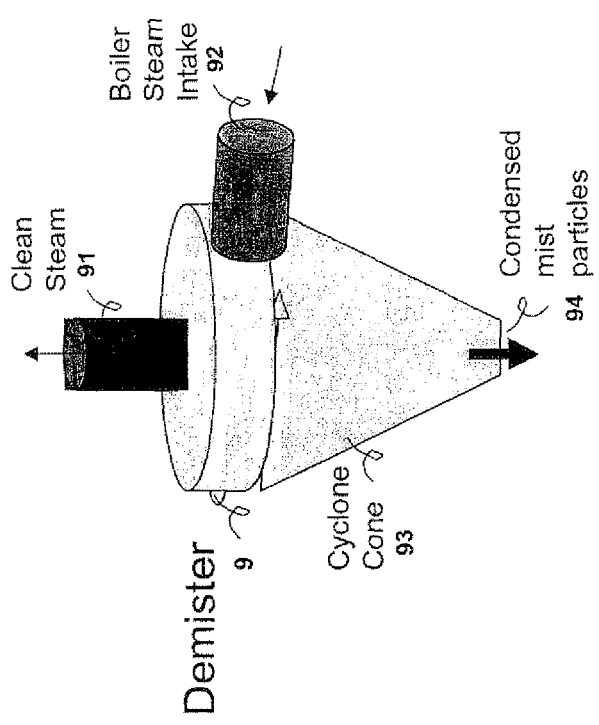
Figure 16—Schematic Diagram of a Cyclone Demister

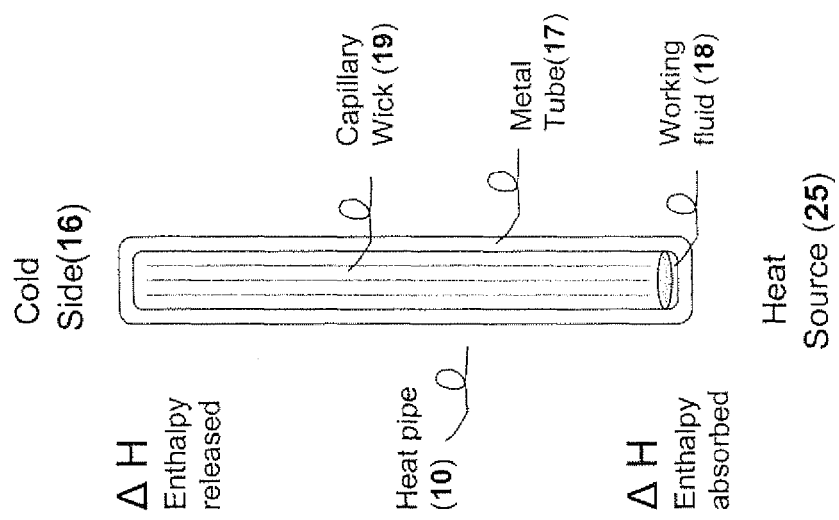
Figure 17—Schematic Diagram of a Heat Pipe

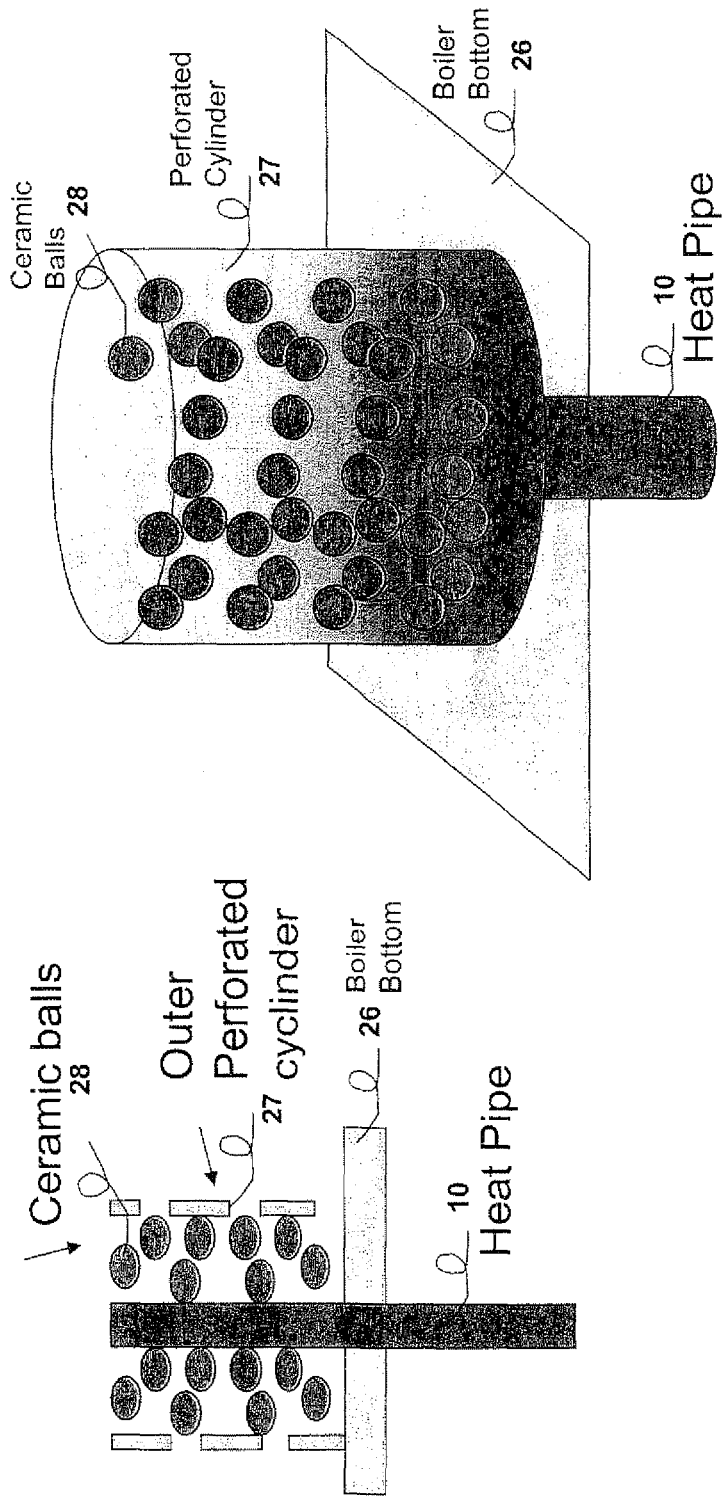
Figure 18—Diagram Illustrating the Self-Cleaning Feature for Heat Pipes

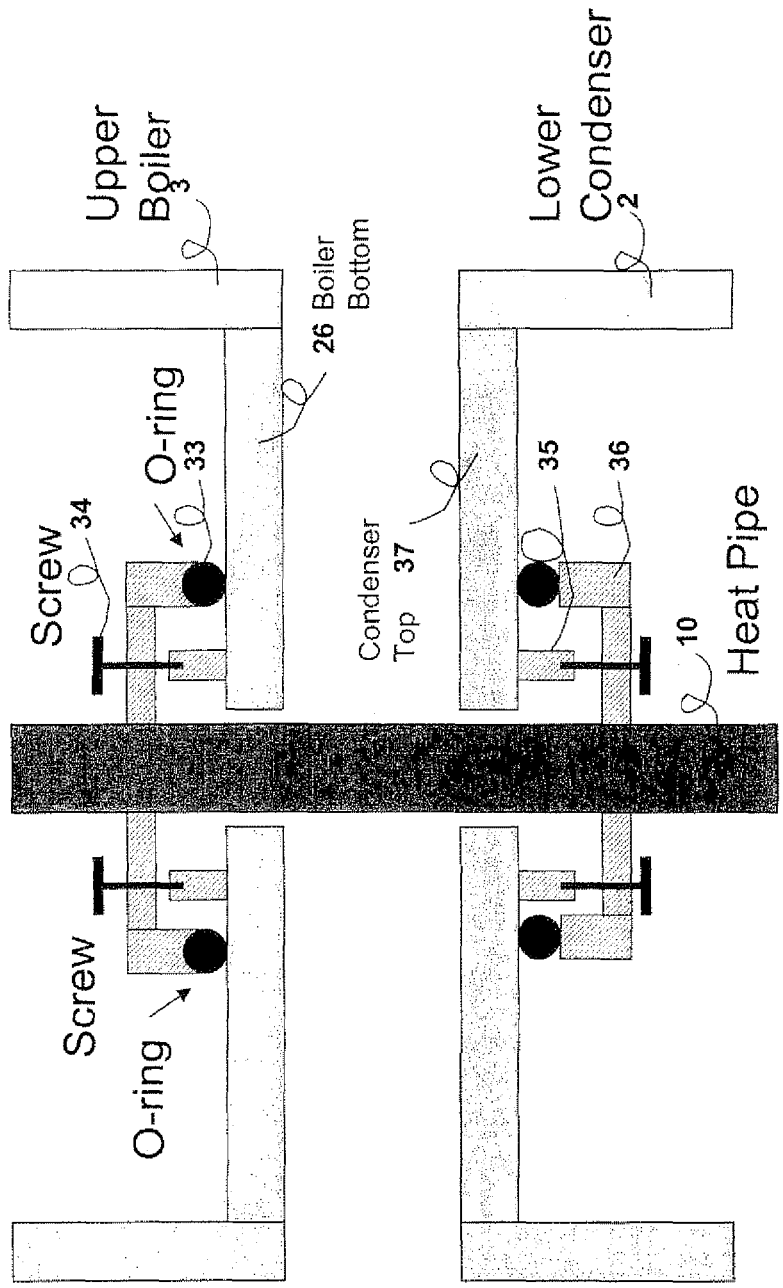
Figure 19—Possible Configuration for Attaching Heat Pipes to provide for Leak-Free Operation

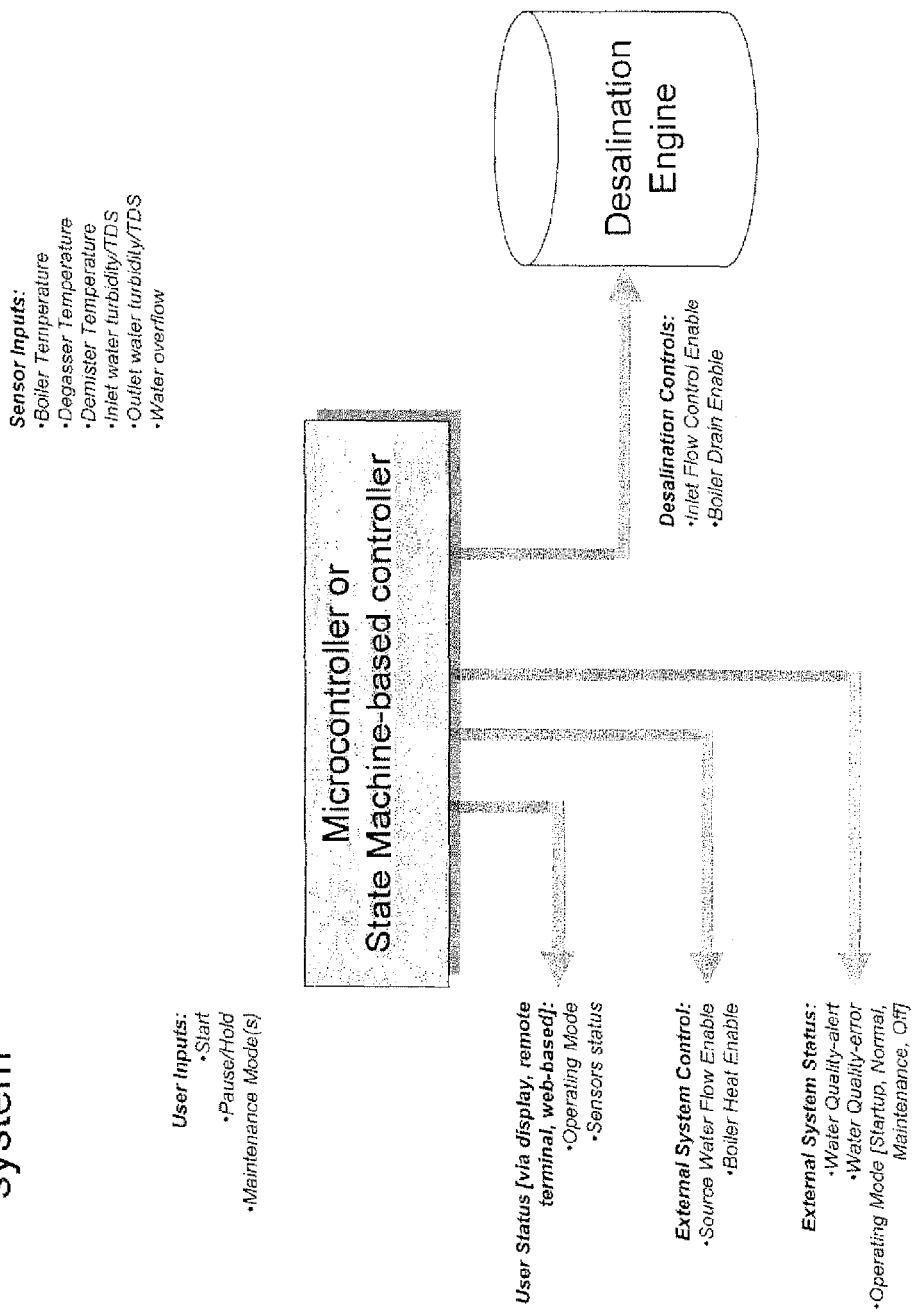
Figure 20 -- Diagram of the control circuitry of an embodiment of the water desalination and purification system

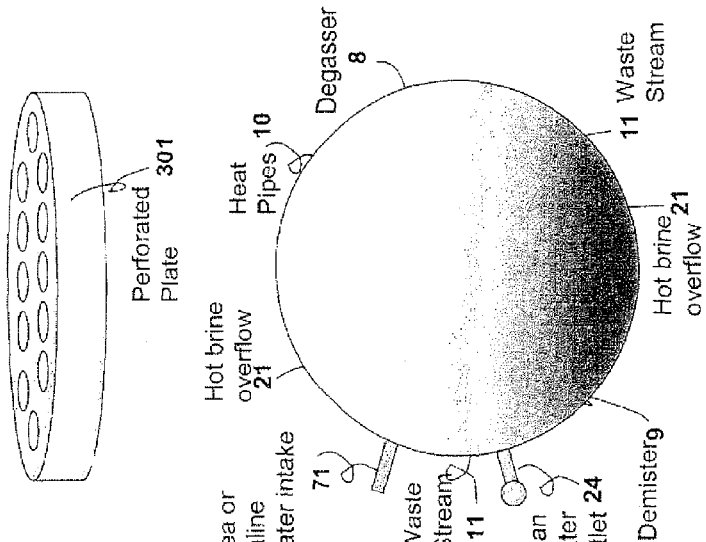
Figure 22 -- Diagram of Perforated Plate
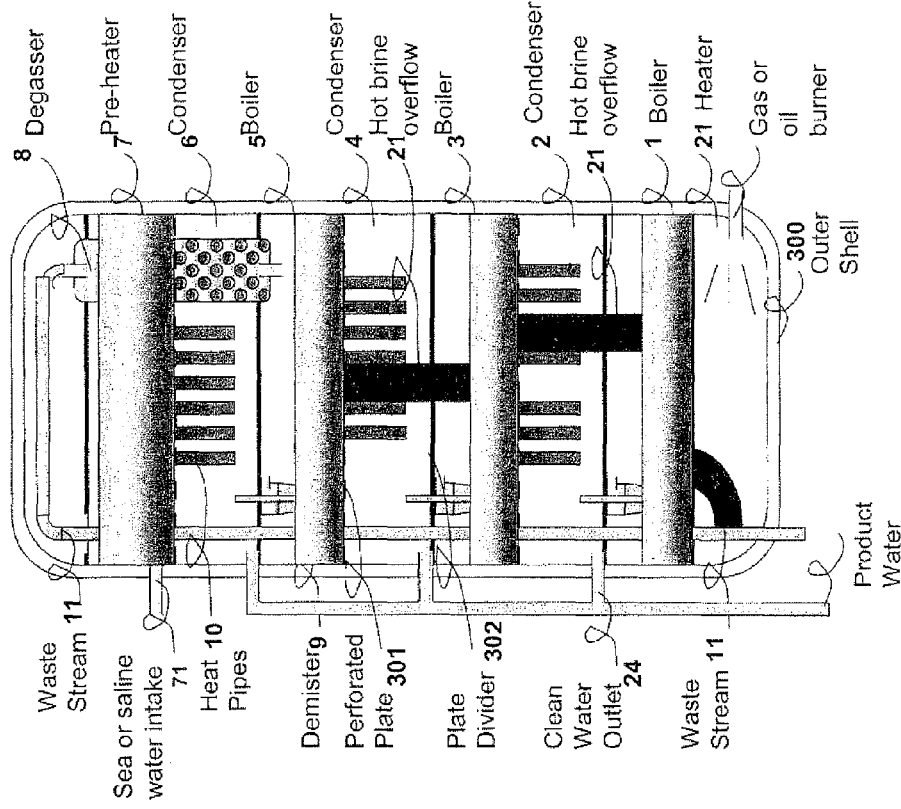
Figure 23 -- Plant View of Stacked Arrangement of Desalination System
Figure 21 -- Elevation View of Stacked Arrangement of Desalination System

LARGE-SCALE WATER PURIFICATION AND DESALINATION

CROSS-REFERENCE TO RELATED APPLICATIONS

The present application is a U.S. National Stage entry under 35 U.S.C. §371 of International Application No. PCT/US2009/057277, filed on Sep. 17, 2009, designating the United States of America and published in English on Mar. 25, 2010, which in turn claims priority to U.S. Provisional Application No. 61/097,835, filed on Sep. 17, 2008, each of which is hereby incorporated by reference in its entirety.

This application claims priority to U.S. Provisional Patent Application No. 61/097,835, filed Sep. 17, 2008, and the entire disclosure of that application is incorporated herein by reference.

This invention relates to the field of water purification and desalination. In particular, embodiments of the invention relate to systems and methods of removing essentially all of a broad spectrum of impurities from water in an automated process that requires minimal cleaning or maintenance during the course of several months to several years, with relatively high yields of product water per unit of input water and ultra-low energy requirements.

BACKGROUND

Water purification technology is rapidly becoming an essential aspect of modern life as conventional water resources become increasingly scarce, municipal distribution systems for potable water deteriorate with age, and increased water usage depletes wells and reservoirs, causing saline water contamination. Additionally, further contamination of water sources is occurring from a variety of activities, which include, for example, intensive agriculture, gasoline additives, and heavy toxic metals. These issues are leading to increasing and objectionable levels of germs, bacteria, salts, MTBE, chlorates, perchlorates, arsenic, mercury, and even the chemicals used to disinfect potable water, in the water system.

Furthermore, even though almost three fourths of the earth is covered by oceans, fresh water resources are limited to some 3% of all planetary water and they are becoming scarcer as a result of population growth and global warming. Approximately 69% of all fresh water is held in ice caps and glaciers which, with increased global melting become unrecoverable, so less than 1% is actually available and most of that (over 90%) is ground water in aquifers that are being progressively contaminated by human activities and saline incursions. Thus, there is an urgent need for technology that can turn saline water, including seawater and brine, into fresh water, while removing a broad range of contaminants.

Conventional desalination and water treatment technologies, such as reverse osmosis (RO) filtration thermal distillation systems like multiple-effect distillation (MED), multiple-stage flash distillation (MSF), or vapor compression distillation (VC) are rarely able to handle the diverse range of water contaminants found in saline environments. Additionally, even though they are commercially available, they often require multiple treatment stages or combination of various technologies to achieve acceptable water quality. RO systems suffer from the requirement of high-water pressures as the saline content increases which render them increasingly expensive in commercial desalination, and they commonly waste more than 30% of the incoming feed water, making them progressively less attractive when water is scarce. Less conventional technologies, such as ultraviolet (UV) light irradiation or ozone treatment, can be effective against viruses and bacteria, but seldom remove other contaminants, such as dissolved gases, salts, hydrocarbons, and insoluble solids. Additionally, most distillation technologies, while they may be superior at removing a subset of contaminants are frequently unable to handle all types of contaminants.

Because commercial desalination plants are normally complex engineering projects that require one to three years of construction, they normally are capital intensive and difficult to move from one place to another. Their complexity and reliance on multiple technologies also make them prone to high maintenance costs. Thus, because RO plants are designed to operate continuously under steady pressure and flow conditions, large pressure fluctuations or power interruptions can damage the membranes, which are expensive to replace; that technology requires extensive pre-treatment of the incoming feed water to prevent fouling of the RO membrane. Thermal distillation systems frequently rely on vacuum to increase water recovery by extracting increasing steam with a given amount of thermal energy; however, vacuum systems in large-scale systems are troublesome because of leaks and require mechanical reinforcement. Thermal systems also rely on heat exchangers to recover some of the heat of condensation, but heat exchangers are prone to fouling and scale formation and require frequent maintenance.

Accordingly, sophisticated distillation systems that are continuous and self-cleaning, that resist corrosion, that are portable and compact and recover a major fraction of the input water, and that are relatively inexpensive and low-maintenance appear as the best long-term option to resolve increasing water contamination problems and water scarcity, worldwide.

SUMMARY

Embodiments of the present invention provide an improved desalination and water purification system. The system can include an inlet, a preheater, a degasser, multiple evaporation chambers and demisters, product condensers, a waste outlet, a product outlet, multiple heat pipes for heat transfer and recovery and a control system. The control system permits operation of the purification system continuously with minimal user intervention or cleaning. The system is capable of removing, from a contaminated water sample, a plurality of contaminant types including microbiological contaminants, radiological contaminants, metals, salts, volatile organics, and non-volatile organics. In embodiments of the system, the volume of water produced can be between about 20% and about 95% of a volume of input water. The system comprises a vertical stack arrangement of evaporation chambers, condensers, and a preheater that is compact and thus portable in the range of 1,000 to 50 million gallons per day of water production.

The system can also include a flow controller for the input water. The flow controller can include a pressure regulator, a pump, a solenoid, a valve, an aperture, and the like. The pressure regulator can maintain water pressure between about 0 kPa and 250 kPa. (0 to 36 psi). The flow controller can maintain water flow at a rate of between 0.5 and 3500 gallons/min. The system can include a sediment trap, a sand filter, and the like. Also, the system can further include a shutdown control. The shutdown control can be, for example, a manual control, a flood control, a tank capacity control, an evaporation chamber capacity control, or similar control device. The feedback control system can be based upon, for example, amount of water in a product water tank, flow of product water through the product outlet, time of water flow, time of no water flow, amount of water in the evaporation chamber, detection of a leak, evaporation chamber pressure, output water quality (total dissolved solids), pressure differential across evaporation chamber, evaporation chamber overflow weir float, and the like.

Also, the system can have a preheater that heats the incoming water to the temperature required in the degasser. Water exiting the preheater can have a temperature of at least about 96° C. The preheat tank may have a spiral arrangement of vanes such that incoming water circulates several turns in the tank, thus providing the residence time to effect pre-heating. Incoming feed water enters the preheater tangentially, is gradually preheated by heat pipes until the required temperature is achieved, and exits the preheater through a downcomer tube that connects either with the degasser or directly with a lower evaporation chamber if there is no need for degassing.

The degasser can be in a substantially vertical orientation, having an upper end and a lower end. Pre-heated water enters the degasser at its upper end, and degassed water exits the degasser proximate to the lower end. In the system, steam from the highest evaporation chamber can enter the degasser proximate to the lower end, and can exit the degasser proximate to the upper end. The degasser can include a matrix adapted to facilitate mixing of water and steam, stripping the inlet water of essentially all organics, volatiles, and gasses by counterflowing the inlet water against an opposite directional flow of a gas in a degasser. The gas can be, for example, steam, air, nitrogen, and the like. The matrix can include substantially spherical particles. However, the matrix can also include non-spherical particles. The matrix can include particles having a size selected to permit uniform packing within the degasser. The matrix can also include particles of distinct sizes, and the particles can be arranged in the degasser in a size gradient. Water can exit the degasser, substantially free of organics and volatile gases.

The upper evaporation chamber can include a cylindrical or rectangular tank with a perforated bottom that accommodates multiple heat transfer pipes. The upper evaporation chamber can also include a central drain, which can be a downcomer tube in fluid communication with a lower evaporation chamber, or at the bottom of the evaporation chamber, or both. The evaporation chamber can also include a self cleaning medium including a plurality of particles, the drain having an opening, the opening having a size that does not permit the particles to pass through the bottom drain, the opening further having a shape that is not complementary to a shape of the particles. The evaporation chamber can include a self cleaning medium for interfering with accumulation of precipitates at least in an area proximate to a heated region of the evaporation chamber. The medium can include a plurality a particles. The particles can be substantially spherical. The particles can also include a characteristic permitting substantially continuous agitation of the particles by boiling of water in the evaporation chamber. The characteristic can be, for example, specific gravity, size, morphology, population number, and the like. The particles can have a selected hardness, so that the hardness permits scouring of the evaporation chamber by the particles without substantially eroding the particles or the evaporation chamber. Furthermore, the particles can be composed of ceramic, metal, glass, or stone. The particles can have a specific gravity greater than about 1.0 and less than about 8.0, or more preferably, between about 2.0 and about 5.0.

The upper demister can be positioned proximate to an upper surface of the evaporation chamber. Steam from the evaporation chamber can enter the demister under pressure. The demister can include a pressure differential, and the pressure differential can be no less than 125 to about 2500 Pa. The demister can be adapted to separate clean steam from waste steam via either cyclonic action or by providing mechanical barriers to mist particles being carried by steam. The ratio of clean steam to waste steam can be greater than about 10:1. The control system can adjust a parameter to regulate steam quality. Steam quality can include, for example, clean steam purity, ratio of clean steam to waste steam, and the like. The parameter can include at least one parameter such as a recess position of a clean steam outlet, a pressure differential across the demister, a resistance to flow of a steam inlet, a resistance to flow of a steam outlet, and the like.

Clean steam from the demister enters an upper condenser that includes vanes for imparting a circular motion to the steam, thus enhancing its residence time in the condenser and ensuring complete steam condensation. The condenser tan is a cylindrical or rectangular tank with a perforated top that accommodates multiple heat pipes. The heat pipes remove the heat of condensation of the steam and transfer such heat either to the upper preheater or to an upper evaporation chamber. Product water can exit the product condenser through the product outlet.

Multiple stages of boiling and condensation can be provided under the upper condenser, thus recycling heat for multiple stages of distillation. Except for the last stage, which is the bottom evaporation chamber, each stage consists of a evaporation chamber, a demister, a condenser, and multiple heat pipes, all identical to those described above.

The bottom evaporation chamber is identical to the upper evaporation chamber, except that a source of heat energy is placed under it or inside the evaporation chamber itself. Heat for evaporation can be electrical, natural gas, petroleum or other hydrocarbon fuels, or any source of waste heat that provides a temperature of about 110 C or higher.

In greater detail, the present disclosure relates to a water purification and desalination system comprising an inlet, a preheater, a degasser, a plurality of evaporation chambers, demisters, heat pipes, and product condensers, a waste outlet, multiple product outlets, a heating chamber, and a control system, wherein the heat of condensation is recovered and reused for additional evaporation, wherein distillation energy may consist of electricity, the combustion of oil, hydrocarbons, or natural gas, or waste heat, and wherein the control system permits continuous operation of the purification and desalination without requiring user intervention or cleaning, and wherein the system is capable of removing, from a contaminated water sample, a plurality of contaminant types including: microbiological contaminants, radiological contaminants, metals, salts, volatile organics, and non-volatile organics; such that water purified in the system has levels of all contaminant types below the levels shown in the MCL Column of Table 1, when the contaminated water has levels of the contaminant types that are up to 25 times greater than the levels shown in the MCL Column of Table 1.

In a further aspect, the system produces a volume of purified water that is between about 20% and about 95% of a volume of input water.

In a further aspect, the system does not require cleaning through at least about two months of use.

In a further aspect, the system does not require cleaning through at least about one year of use or longer.

In a further aspect, the system comprises an inlet switch to regulate flow of water through the inlet.

In a further aspect, the inlet switch comprises a mechanism selected from the group consisting of a solenoid, a valve, and an aperture.

In a further aspect, the inlet switch is controlled by the control system.

In a further aspect, the system comprises a shutdown control.

In a further aspect, the shutdown control is selected from the group consisting of a manual control, a flood control, a condenser capacity control, and an evaporation chamber capacity control.

In a further aspect, the control system controls the inlet based upon feedback from at least one of a temperature sensor in a evaporation chamber, a condenser float, and a flood detector.

In a further aspect, the control system controls the switch based upon feedback from the purification system.

In a further aspect, the feedback is based upon at least one characteristic selected from the group consisting of: amount of water in a product water container, flow of product water through the product outlet, time of water flow, time of no water flow, amount of water in the evaporation chamber, detection of a leak, evaporation chamber pressure, output water quality (total dissolved solids), pressure differential across the evaporation chamber, and movement of water across an evaporation chamber overflow weir float.

In a further aspect, the system comprises a flow controller.

In a further aspect, the flow controller comprises a pressure regulator.

In a further aspect, the pressure regulator maintains water pressure between about 0 kPa and 250 kPa. (0 to 36 psi)

In a further aspect, the system comprises a sediment trap.

In a further aspect, water exiting the preheater has a temperature of at least about 96° C.

In a further aspect, the degasser is in a substantially vertical orientation, having an upper end and a lower end.

In a further aspect, heated water from the preheater enters the degasser proximate to the upper end.

In a further aspect, heated water exits the degasser proximate to the lower end.

In a further aspect, steam from an evaporation chamber enters the degasser proximate to the lower end.

In a further aspect, the steam exits the degasser proximate to the upper end.

In a further aspect, the degasser comprises a matrix adapted to facilitate mixing of water and steam.

In a further aspect, the matrix comprises substantially spherical particles.

In a further aspect, the matrix comprises non-spherical particles.

In a further aspect, the matrix comprises particles having a size selected to permit uniform packing within the degasser.

In a further aspect, the matrix comprises particles of distinct sizes, wherein the particles are arranged in the degasser in a size gradient.

In a further aspect, water exiting the degasser is substantially free of organics and volatile gasses.

In a further aspect, an evaporation chamber includes a plurality of heat pipes delivering heat that is transferred from a lower condenser.

In a further aspect, the evaporation chamber further comprises a drain, and wherein the drain is at or about the middle of the chamber.

In a further aspect, the evaporation chamber further comprising a self cleaning medium comprising a plurality of particles enclosed within a concentric perforated cylinder surrounding each heat pipe.

In a further aspect, an evaporation chamber comprises a self cleaning medium for interfering with accumulation of precipitates at least in an area proximate to the heat pipes in the evaporation chamber.

In a further aspect, the medium comprises a plurality of particles.

In a further aspect, the particles are substantially spherical.

In a further aspect, the particles comprise a characteristic permitting substantially continuous agitation of the particles by boiling of water in the evaporation chamber.

In a further aspect, the characteristic is selected from the group consisting of specific gravity, size, morphology, population number and composition.

In a further aspect, the particles have a selected hardness, wherein the hardness permits scouring of the evaporation chamber by the particles without substantially eroding the particles or the evaporation chamber.

In a further aspect, the particles are composed of ceramic, metal, glass, or stone.

In a further aspect, the particles have a specific gravity greater than about 1.0 and less than about 8.0.

In a further aspect, the particles have a specific gravity between about 2.0 and about 5.0.

In a further aspect, the heating chamber further comprising electric heating elements, gas or oil burners, or heat pipes that transfer heat from waste heat sources, and wherein the heating chamber is adjacent to the bottom portion of the evaporation chamber.

In a further aspect, a demister is positioned proximate to an upper surface of an evaporation chamber.

In a further aspect, steam from an evaporation chamber enters a demister under pressure.

In a further aspect, a demister is configured to produce a pressure differential, wherein the pressure differential is no less than 125 to 2500 Pa.

In a further aspect, a demister is adapted to separate clean steam from waste steam via cyclonic action.

In a further aspect, an evaporation chamber prevents condensed droplets from entering a demister by means of baffle guards and metal grooves.

In a further aspect, a ratio of clean steam to waste steam is greater than about 10:1.

In a further aspect, a steam quality comprises at least one quality selected from the group consisting of: clean steam purity, ratio of clean steam to waste steam, and total volume of clean steam.

In a further aspect, a demister control parameter comprises at least one parameter selected from the group consisting of: a recess position of a clean steam outlet, a pressure differential across the demister, a resistance to flow of a steam inlet, and a resistance to flow of a steam outlet.

In a further aspect, the system comprises heat pipes for cooling a condenser product.

In a further aspect, product water exits a product condenser through the product outlet.

In a further aspect, waste water exits the system through the waste outlet.

In a further aspect, the control system diverts product water to waste drainage until the system reaches stable operating temperatures.

In a further embodiment, the present disclosure relates to a method of purifying and desalinating water, comprising the steps of: providing a source of inlet water comprising at least one contaminant in a first concentration; passing the inlet water through a preheater capable of raising a temperature of the inlet water above 90° C.; stripping the inlet water of essentially all organics, volatiles, and gasses by counterflowing the inlet water against an opposite directional flow of a gas in a degasser; maintaining the water in an evaporation chamber for an average residence time of between 10 and 90 minutes, or longer under conditions permitting formation of steam; discharging steam from the evaporation chamber to a cyclone demister; separating clean steam from contaminant-containing waste in the demister such that yield of clean steam is at least about 4 times greater than yield of waste from the demister; condensing the clean steam to yield purified water, comprising the at least one contaminant in a second concentration, wherein the second concentration is lower than the first concentration; and recovering and transferring heat from a condenser into an upper evaporation chamber or preheater, such that the amount of heat recovered is at least 50% of the heat of condensation.

In a further aspect, the at least one contaminant comprises a contaminant selected from the group consisting of: microorganism, radionuclide, salt, and organic; and wherein the second concentration is not more than a concentration shown in Table 3, and wherein the first concentration is at least about 10 times the second concentration.

In a further aspect, the first concentration is at least about 25-fold greater than the second concentration.

In a further aspect, the gas is selected from the group consisting of: steam, air, and nitrogen.

In a further aspect, the process steps are repeated automatically for at least about three months with no required cleaning or maintenance.

In a further aspect, the process steps are repeated automatically for at least about one year with no required cleaning or maintenance.

In a further aspect, a stacked arrangement of the evaporation chambers, condensers, and preheater is enclosed in a metal shell, with perforated plates that separate evaporation chambers and condensers.

In a further aspect, the perforated plates allow the passage of heat pipes, degassers, demisters, brine overflow tubes, and waste stream tubes.

In a further aspect, the materials of construction of evaporation chambers, preheaters, and heat pipes are made from a non-corrosive titanium alloy In a further aspect, the non-corrosive titanium alloy comprises Ti-6A1,4V alloy.

In a further aspect, the evaporation chambers, preheaters, and heat pipes comprise common steel or other metal or alloys coated with non-corrosive chlorofluorocarbon polymers.

BRIEF DESCRIPTION OF THE DRAWINGS

FIGS. 1A and 1B are front views of two embodiments of the desalination/water purification system.

FIG. 2 is a schematic diagram of the bottom evaporation chamber.

FIG. 3 is an elevation view of the bottom evaporation chamber.

FIGS. 4 (a) through 4 (e) show possible heating configurations.

FIG. 5 is a schematic diagram of a condenser.

FIG. 6 is a plant view of a condenser.

FIGS. 7A and 7B are schematic diagrams of a evaporation chamber for double and triple distillation configurations.

FIG. 8 is a schematic diagram of a condenser.

FIG. 9 is a schematic diagram of a preheater.

FIG. 10 is a plant view of a preheater.

FIG. 11 is an elevation view of a preheater.

FIG. 12 is a schematic diagram of a degasser.

FIG. 13 is an elevation view of a degasser.

FIG. 14 is a diagram of a baffle guard and a metal groove.

FIG. 15 is a picture of a baffle guard.

FIG. 16 is a schematic diagram of a cyclone demister.

FIG. 17 is a schematic diagram of a heat pipe.

FIG. 18 is a diagram illustrating the self-cleaning feature for a heat pipe.

FIG. 19 is an illustration of a possible configuration for attaching heat pipes to provide for leak-free operation.

FIG. 20 is a diagram of the control circuitry of an embodiment of the desalination and water purification system.

FIG. 21 is an elevation view of an alternative embodiment for a stacked arrangement of a desalination system.

FIG. 22 is a diagram of a perforated plate for an alternative embodiment of a desalination system.

FIG. 23 is a plant view of an alternative embodiment for a stacked arrangement of a desalination system.

DETAILED DESCRIPTION

Embodiments of the invention are disclosed herein, in some cases in exemplary form or by reference to one or more Figures. However, any such disclosure of a particular embodiment is exemplary only, and is not indicative of the full scope of the invention.

Embodiments of the invention include systems, methods, and apparatus for water purification and desalination. Preferred embodiments provide broad spectrum water purification that is fully automated and that does not require cleaning or user intervention over very long periods of time. For example, systems disclosed herein can run without user control or intervention for 2, 4, 6, 8, 10, or 12 months, or longer. In preferred embodiments, the systems can run automatically for 1, 2, 3, 4, 5, 6, 7, 8, 9, 10, 11, 12, 13, 14, or 15 years, or more.

Embodiments of the invention thus provide a water purification and desalination system including at least an inlet for saline water, contaminated water, or seawater, a preheater, a degasser, one or more evaporation chambers, one or more demisters, one or more product condensers with a product outlet, a waste outlet, and a control system, wherein product water exiting the outlet is substantially pure, and wherein a volume of product water produced is at least about 10, 15, or 20% of a volume of input water, and wherein the control system permits operation of the purification system continuously without requiring user intervention. In preferred embodiments, the volume of product water produced is at least about 25, 30, 35, 40, 45, 50, 55, 60, 65, 70, 75, 80, 85, 90, 95, 96, 97, 98, or 99%, or more, of the volume of input water. Thus the system is of great benefit in conditions in which there is relatively high expense or inconvenience associated with obtaining inlet water and/or disposing of wastewater. The system is significantly more efficient in terms of its production of product water per unit of input water or wastewater, than many other systems.

Substantially pure water can be, in different embodiments, water that meets any of the following criteria: water purified to a purity, with respect to any contaminant, that is at least 25, 30, 35, 40, 45, 50, 55, 60, 65, 70, 75, 80, 85, 90, 95, 100, 125, 150, 175, 200, 250, 500, 750, 1000, or more, times greater purity than the inlet water. In other embodiments, substantially pure water is water that is purified to one of the foregoing levels, with respect to a plurality of contaminants present in the inlet water. That is, in these embodiments, water purity or quality is a function of the concentration of an array of one or more contaminants, and substantially pure water is water that has, for example, a 25-fold or greater ratio between the concentration of these contaminants in the inlet water as compared to the concentration of the same contaminants in the product water.

In other embodiments, water purity can be measured by conductivity, where ultrapure water has a conductivity typically less than about 0.1 μSiemens/cm, and distilled water typically has a conductivity of about 0.5. In such embodiments, conductivity of the product water is generally between about 0.1 and 0.77, typically between about 0.2 and 0.6, preferably between about 0.2 and 0.5, 0.2 and 0.4, or 0.2 and 0.3. Conductivity is a measure of total dissolved solids (TDS) and is a good indicator of water purity with respect to salts, ions, minerals, and the like.

Alternatively, water purity can be measured by various standards such as, for example, current U.S. Environmental Protection Agency (EPA) standards as listed in Table 1 and Table 2, as well as other accepted standards as listed in Table 2. Accordingly, preferred embodiments of the invention are capable of reducing any of one or more contaminants from a broad range of contaminants, including for example any contaminant(s) listed in Table 1, wherein the final product water has a level for such contaminant(s) at or below the level specified in the column labeled "MCL" (maximum concentration level) where the inlet water has a level for such contaminant(s) that is up to about 25-fold greater than the specified MCL. Likewise, in some embodiments and for some contaminants, systems of the invention can remove contaminants to MCL levels when the inlet water has a 30-, 40-, 50-, 60-, 70-, 80-, 90-, 100-, 150-, 250-, 500-, or 1000-fold or more; higher contamination than the MCL or the product water.

While the capacity of any system to remove contaminants from inlet water is to some extent a function of the total impurity levels in the inlet water, systems of the invention are particularly well suited to remove a plurality of different contaminants, of widely different types, from a single feed stream, producing water that is comparable to distilled water and is in some cases comparable to ultrapure water. It should be noted that the "Challenge Water" column in Table 1 contains concentration levels for contaminants in water used in EPA tests. Preferred embodiments of water purification systems of the invention typically can remove much greater amounts of initial contaminants than the amounts listed in this column. However, of course, contaminant levels corresponding to those mentioned in the "Challenge Water" column are likewise well within the scope of the capabilities of embodiments of the invention.

TABLE 1

| | Units | Protocol | MCL | Challenge Water |
|---|---|---|---|---|
| Metals | | | | |
| Aluminum | Ppm | | 0.2 | 0.6 |
| Antimony | Ppm | | 0.006 | 0.1 |
| Arsenic | Ppm | | 0.01 | 0.1 |
| Beryllium | Ppm | | 0.004 | 0.1 |
| Boron | Ppb | | | 20 |
| Chromium | Ppm | | 0.1 | 0.1 |
| Copper | Ppm | | 1.3 | 1.3 |
| Iron | Ppm | | 0.3 | 8 |
| Lead | Ppm | | 0.015 | 0.1 |
| Manganese | ppm | | 0.05 | 1 |
| Mercury | ppm | | 0.002 | 0.1 |
| Molybdenum | ppm | | | 0.01 |
| Nickel | ppm | | | 0.02 |
| Silver | ppm | | 0.1 | 0.2 |
| Thallium | ppm | 0.002 | | 0.01 |
| Vanadium | ppm | | | 0.1 |
| Zinc | ppm | | 5 | 5 |
| Subtotal of entire mix | | | | 36.84 |
| Inorganic salts | | | | |
| Bromide | ppm | | | 0.5 |
| Chloride | ppm | | 250 | 350 |
| Cyanide | ppm | | 0.2 | 0.4 |
| Fluoride | ppm | | 4 | 8 |
| Nitrate, as N03 | ppm | | 10 | 90 |
| Nitrite, as N2 | ppm | | 1 | 2 |
| Sulfate | ppm | | 250 | 350 |
| Subtotal of entire mix | | | | 800.9 |
| Fourth Group: 2 Highly volatile VOCs + 2 non-volatiles | | | | |
| Heptachlor | ppm | EPA525.2 | 0.0004 | 0.04 |
| Tetrachloroethylene-PCE | ppm | EPA524.2 | 0.00006 | 0.02 |
| Epichlorohydrin | ppm | | 0.07 | 0.2 |
| Pentachlorophenol | ppm | EPA515.4 | 0.001 | 0.1 |
| Subtotal of entire mix | | | | 0.36 |
| Fifth Group: 2 Highly volatile VOCs + 2 non-volatiles | | | | |
| Carbon tetrachloride | ppm | EPA524.2 | 0.005 | 0.01 |
| m, p-Xylenes | ppm | EPA524.2 | 10 | 20 |

TABLE 1-continued

| | Units | Protocol | MCL | Challenge Water |
|---|---|---|---|---|
| Di(2-ethylhexyl) adipate | ppm | EPA525.2 | 0.4 | 0.8 |
| Trichloro acetic acid | ppm | SM6251B | 0.06 | 0.12 |
| Subtotal of entire mix | | | | 21.29 |
| Sixth Group: 3 Highly volatile VOCs + 3 non-volatiles | | | | |
| 1,1-dichloroethylene | ppm | | 0.007 | 0.15 |
| Ethylbenzene | ppm | EP524.2 | 0.7 | 1.5 |
| Aldrin | ppm | EPA505 | 0.005 | 0.1 |
| Dalapon (2,2,-Dichloropropionic acid) | ppm | EPA515.4 | 0.2 | 0.4 |
| Carbofuran (Furadan) | ppm | EPA531.2 | 0.04 | 0.1 |
| 2,4,5-TP (silvex) | ppm | EPA515.4 | 0.05 | 0.1 |
| Subtotal of entire mix | | | | 2.35 |
| Seventh Group: 3 Highly volatile VOCs + 3 non-volatiles | | | | |
| Trichloroethylene-TCE | ppm | EPA524.2 | 0.005 | 0.1 |
| Toluene | ppm | EPA524.2 | 1 | 2 |
| 1,2,4 Trichlorobenzene | ppm | EPA524.2 | 0.07 | 0.15 |
| 2,4-D | ppm | EPA515.4 | 0.07 | 0.15 |
| Alachlor (Alanex) | ppm | EPA 525.2 | 0.002 | 0.1 |
| Simazine | ppm | EPA525.2 | 0.004 | 0.1 |
| Subtotal of entire mix | | | | 2.6 |
| Eighth Group: 3 Highly volatile VOCs + 3 non-volatiles | | | | |
| Vinylchloride (chloroethene) | ppm | EPA524.2 | 0.002 | 0.1 |
| 1,2-dichlorobenzene (1,2 DCB) | ppm | EPA524.2 | 0.6 | 1 |
| Chlorobenzene | ppm | EPA524.2 | 0.1 | 0.2 |
| Atrazine | ppm | EPA 525.2 | 0.003 | 0.1 |
| Endothal | ppm | EPA548.1 | 0.01 | 0.2 |
| Oxamyl (Vydate) | ppm | EPA531.2 | 0.2 | 0.4 |
| Subtotal of entire mix | | | | 2 |
| Ninth Group: 3 Highly volatile VOCs + 3 non-volatiles | | | | |
| Styrene | ppm | EPA524.2 | 0.1 | 1 |
| Benzene | ppm | EPA524.2 | 0.005 | 0.2 |
| Methoxychlor | ppm | EPA 525.2/505 | 0.04 | 0.1 |
| Glyphosate | ppm | EPA547 | 0.7 | 1.5 |
| Pichloram | ppm | EPA515.4 | 0.5 | 1 |
| 1,3-dichlorobenzene (1,3 DCB) | ppm | EPA524.2 | 0.075 | 0.15 |
| Subtotal of entire mix | | | | 3.95 |
| Tenth Group: 3 Highly volatile VOCs + 3 non-volatiles | | | | |
| 1,2-dichloropropane (DCP) | ppm | EPA524.2 | 0.005 | 0.1 |
| Chloroform | ppm | EPA524.2 | 80 | 0.1 |
| Bromomethane (methyl bromide) | ppm | EPA524.2 | | 0.1 |
| PCB1242 Arochlor | ppb | EPA 505 | 0.5 | 1 |
| Chlordane | ppm | EPA 525.2/505 | 0.002 | 0.2 |
| MEK—Methylehtylketone(2- | ppb | EPA524.2 | | 0.2 |
| Subtotal of entire mix | | | | 1.7 |
| Eleventh Group: 4 volatile non-volatile PCBs | | | | |
| 2,4-DDE (dichlorodiphenyl dichloroethylene) | ppm | EPA525.2 | | 0.1 |
| Bromodichloromethane | ppb | EPA524.2 | 80 | 0.1 |
| 1,1,1-Trichloroethane (TCA) | ppm | EPA524.2 | 0.2 | 0.4 |
| Bromoform | ppm | EPA524.2 | 80 | 0.1 |
| PCB 1221 Arochlor | ppm | EPA 505 | 0.5 | 0.05 |

TABLE 1-continued

| | Units | Protocol | MCL | Challenge Water |
|---|---|---|---|---|
| PCB1260 Arochlor | ppm | EPA 505 | 0.5 | 0.05 |
| PCB 1232 Arochlor | ppm | EPA 505 | 0.5 | 0.05 |
| PCB 1254 Arochlor | ppm | EPA 505 | 0.5 | 0.05 |
| PCB 1016 Arochlor | ppm | EPA 505 | 0.5 | 0.05 |
| Subtotal of entire mix Group No 12: 5 volatile VOCs + 5 non-volatile PCBs | | | | 0.95 |
| dichloromethane (DCM) Methylenechloride | ppm | EPA524.2 | 0.005 | 0.1 |
| 1,2-dichloroethane | ppm | | 0.005 | 0.1 |
| Lindane (gamma BHC) | ppm | EPA525.2 EPA | 0.0002 | 0.05 |
| Benzo(a) pyrene | ppm | 525.2 EPA | 0.0002 | 0.05 |
| Endrin | ppm | 525.2/505 | 0.002 | 0.05 |
| 1,1,2-Trichloroethane (TCA) | ppm | EPA524.2 | 0.005 | 0.05 |
| MTBE | ppm | EPA524.2 | | 0.05 |
| Ethylene dibromide—EDB | ppm | EPA504.1 EPA | 0.00005 | 0.05 |
| Dinoseb | ppm | 515.4 | 0.007 | 0.05 |
| Di(2-ethylhexyl) phthalate (DEHP) | ppm | EPA525.2 | 0.006 | 0.05 |
| Subtotal of entire mix Group No 13: Balance of 6 VOCs | | | | 0.5 |
| Chloromethane (methyl chloride) | ppm | EPA524.2 | | 0.1 |
| Toxaphene | ppm | EPA 505 | 0.003 | 0.1 |
| trans-1,2-dichloroethylene | ppm | EPA524.2 | 0.1 | 0.2 |
| Dibromochloromethane | ppm | EPA524.2 | 80 | 0.05 |
| cis-1,2-dichloroethylene | ppm | EPA524.2 EPA | 0.07 | 0.05 |
| 1,2-Dibromo-3-Chloro propane | ppm | 504.1 | 0.0002 | 0.05 |

Determination of water purity and/or efficiency of purification performance can be based upon the ability of a system to remove a broad range of contaminants. For many biological contaminants, the objective is to remove substantially all live contaminants. Table 2 lists additional common contaminants of source water and standard protocols for testing levels of the contaminants. The protocols listed in Tables 1 and 2, are publicly available at hypertext transfer protocol www.epa.gov/safewater/mcl.html#mcls for common water contaminants; Methods for the Determination of Organic Compounds in Drinking Water, EPA/600/4-88-039, December 1988, Revised, July 1991. Methods 547, 550 and 550.1 are in Methods for the Determination of Organic Compounds in Drinking Water—Supplement I, EPA/600-4-90-020, July 1990. Methods 548.1, 549.1, 552.1 and 555 are in Methods for the Determination of Organic Compounds in Drinking Water—Supplement II, EPA/600/R-92-129, August 1992. Methods 502.2, 504.1, 505, 506, 507, 508, 508.1, 515.2, 524.2 525.2, 531.1, 551.1 and 552.2 are in Methods for the Determination of Organic Compounds in Drinking Water—Supplement III, EPA/600/R-95-131, August 1995. Method 1613 is titled "Tetra-through OctaChlorinated Dioxins and Furans by Isotope-Dilution HRGC/HRMS", EPA/821-B-94-005, October 1994. Each of the foregoing is incorporated herein by reference in its entirety.

TABLE 2

| | | Protocol |
|---|---|---|
| 1 | Metals & Inorganics | |
| | Asbestos | EPA 100.2 |
| | Free Cyanide | SM 4500CN-F |
| | Metals-Al, Sb, Be, B, Fe, Mn, Mo, Ni, Ag, Tl, V, Zn | EPA 200.7/200.8 |
| | Anions-N0$_3$—N, NO$_2$—N, Cl, SO$_4$, Total Nitrate/Nitrite | EPA 300.0 A |
| | Bromide | EPA 300.0/300.1 |
| | Turbidity | EPA 180.1 |
| 2 | Organics | |
| | Volatile Organics-VOASDWA list + Nitrozbenzene | EPA 524.2 |
| | EDB & DBCP | EPA 504.1 |
| | Semivolatile Organics-ML525 list + EPTC | EPA 525.2 |
| | Pesticides and PCBs | EPA 505 |
| | Herbicides-Regulated/Unregulated compounds | EPA 515.4 |
| | Carbamates | EPA 531.2 |
| | Glyphosate | EPA 547 |
| | Diquat | EPA 549.2 |
| | Dioxin | EPA 1613b |
| | 1,4-Dioxane | EPA 8270m |
| | NDMA-2 ppt MRL | EPA 1625 |
| 3 | Radiologicals | |
| | Gross Alpha & Beta | EPA 900.0 |
| | Radium 226 | EPA 903.1 |
| | Uranium | EPA 200.8 |
| 4 | Disinfection By-Products | |
| | THMs/HANs/HKs | EPA 551.1 |
| | HAAs | EPA 6251B |
| | Aldehydes | SM 6252m |
| | Chloral Hydrate | EPA 551.1 |
| | Chloramines | SM 4500 |
| | Cyanogen Chloride | EPA 524.2m |

TABLE 3

Exemplary contaminants for system verification

| | | MCLG[1] |
|---|---|---|
| 1 | Metals & Inorganics | |
| | Asbestos | <7 MFL[2] |
| | Free Cyanide | <0.2 ppm |
| | Metals-Al, Sb, Be, B, Fe, Mn, Mo, Ni, Ag, Tl, V, Zn | 0.0005 ppm |
| | Anions-N0$_3$—N, NO$_2$—N, Cl, SO$_4$, Total Nitrate/Nitrite | <1 ppm |
| | Turbidity | <0.3 NTU |
| 2 | Organics | |
| | Volatile Organics-VOASDWA list + Nitrozbenzene EDB & DBCP | 0 ppm |
| | Semivolatile Organics-ML525 list + EPTC | <0.001 ppm |
| | Pesticides and PCBs | <0.2 ppb |
| | Herbicides-Regulated/Unregulated compounds | <0.007 ppm |
| | Glyphosate | <0.7 ppm |
| | Diquat | <0.02 ppm |
| | Dioxin | 0 ppm |
| 3 | Radiologicals | |
| | Gross Alpha & Beta | <5 pCi/l[3] |
| | Radium 226 | 0 pCi/l[3] |
| | Uranium | <3 ppb |
| 4 | Disinfection By-Products | |
| | Chloramines | 4 ppm |
| | Cyanogen Chloride | 0.1 ppm |
| 5 | Biologicals | |
| | Cryptosporidium | 0[4] |
| | Giardia Lamblia | 0[4] |
| | Total coliforms | 0[4] |

[1]MCLG = maximum concentration limit guidance
[2]MFL = million fibers per liter
[3]pCi/l = pico Curies per liter
[4]Substantially no detectable biological contaminants

Overall Description of Water Purification and Desalination System

In preferred embodiments, such as those shown in FIGS. 1A and 1B, the water purification and desalination system consists of a vertically stacked arrangement of evaporation chambers (also known as boilers, boiling chambers, or boiling tanks) 1, 3 and 5 and condensers (also known as condensing chambers) 2, 4 and 6 whereby a source of heat is provided at the bottom of the stack, a preheater (also known as a preheating chamber) 7 is provided at the top of the stack, a degasser 8 is provided at the top of the system to remove volatile organic compounds from the incoming water, a plurality of demisters (also known as demisting devices) 9 are provided to remove contaminated mist particles from each evaporation chamber, a plurality of heat pipes 10 are provided to recover heat from each condenser and transfer such heat to an upper evaporation chamber, and a waste stream outlet 11 is provided to remove and drain water contaminants. Various alternative configurations to the vertical stacked arrangement are possible to those skilled in the art, such as, for example, a lateral arrangement of evaporation chambers, condensers, and preheater, and the like.

FIGS. 21, 22, and 23 illustrate an alternative embodiment of a vertically stacked arrangement of evaporation chambers 1, 3 and 5 and condensers 2, 4 and 6 whereby a source of heat is provided at the bottom of the stack, a preheater 7 is provided at the top of the stack, a degasser 8 is provided at the top of the system to remove volatile organic compounds from the incoming water, a plurality of demisters 9 are provided to remove contaminated mist particles from each evaporation chamber, a plurality of heat pipes 10 are provided to recover heat from each condenser and transfer such heat to an upper evaporation chamber, and a waste stream outlet 11 is provided to remove and drain water contaminants. In such an alternative embodiment, all the evaporation chambers, condensers, and preheaters are encased in an outer shell 300, and the individual tanks are separated by plates, some of which are perforated plates 301 in order to accommodate the passage of heat pipes 10, degasser 8, hot brine overflow tubes 21, waste stream tube 11, and demisters 9. This alternative embodiment confers certain cost advantages in manufacturing, and provides for a simpler configuration that minimizes heat losses.

Incoming water containing contaminants, such as saline water or seawater, continuously enters the system at the top into a preheater tank 7. The volume of flow into the system is controlled by a flow controller, which can be a constant flow pump, a variable flow pump with a control valve, or various electronic control sensors that control the incoming flow pressure. In connection with the flow controller, optionally the flow controller can moderate water flow into the system by varying pressure, and such pressure variations can be signaled by detection within the system of greater demand for inlet water, and the like. This variable control of flow, rather than binary control of flow, can permit capturing certain efficiencies in the system. Alternatively, the incoming flow volume into the system may be controlled by a signal received indicating that the system is capable of receiving additional water for the purification process. Such feedback of demand for more inlet water can come from various points within the system including, for example, water level in the evaporation chamber(s) 1, 3 and 5, water level in the product condenser(s) 2, 4 and 6, temperature of preheated water entering the degasser 8, temperature or volume of steam leaving the evaporation chamber(s), and the like.

Other controls and feedback points can provide further benefit in the automated function of the system including, for example, detection of water quality at any point in the system, detection of volume of water or steam at any point in the system, detection of leaks or temperatures that are indicative of a system malfunction, and the like. Embodiments of the system contemplate all such controls and combinations of controls. These include, for example, controls detecting flooding, evaporation chamber capacity, and the like. In various embodiments, feedback can be qualitative and/or quantitative. These can include, for example, the amount of water in a product condenser(s), flow of product water through the product outlet, time of water flow, amount of water in the evaporation chamber, detection of a leak, evaporation chamber pressure, output water quality (such as, for example, a measure of total dissolved solids), pressure differential across the evaporation chamber or across other points in the system, flow of water across an evaporation chamber overflow, and the like.

Once heat energy is supplied either by electricity, natural gas or oil burners, or waste heat and the system is turned on, the system is configured for fully automatic control essentially throughout the life of the system. The system includes various feedback mechanisms to avoid flooding and to regulate water flow, pressure, output, and continuous cleaning, such that user intervention under normal circumstances is not required. Among these controls is a float level detector in the preheater 7, a side float switch, a timer, temperature sensors, and a power meter.

Shut down controls include a manual control, a flood control which can be a float or a moisture detector in the base of the system, a condenser capacity control and an evaporation chamber capacity control. In addition to controls that provide binary, on/off, switching of inlet water or other parameters, the system further contemplates variable controls such as, for example, pressure- or volume-based flow controls, pressure regulators, and the like. In preferred embodiments, a pressure regulator can regulate inlet water pressure so that it is between 0 and 250 kPa, for example. In other embodiments, the pressure can be 10, 20, 30, 40, 50, 75, 100, 125, 150, 175, 200, 225, 275, 300, 350, 400, 450, or 500 kPa, or more. Regulation of pressure, optionally in combination with regulation of other parameters, can attenuate volume and velocity of water flow in the system. For example, pressure regulation in combination with the dimensions of the system can provide water flow rates of between 2.5 and 132,000 liters/min, or more. Although the systems described herein are primarily described in terms of relatively large scale water production, the system is scalable to any volume of water production. Accordingly there is no upper or lower limit to the volume of water flow. Exemplary flow rates, however, include ranges of 10 to 500 ml/min, 5 to 1,000 liters/min, 30 to 30,000 liter/min, 400 to 200,000 liter/min, and the like.

The system can further include a sediment trap capable of removing sediments from inlet water, so as to avoid premature fouling of the system with such sediments. Various sorts of sediment traps are known in the art, and can be selected for use with the systems of the invention. Likewise, to minimize user intervention and need for cleaning, a sediment trap can itself have self-cleaning features. For example, a sediment trap can have alternating sand filters, or revolving screens, wherein rotation from a fouled screen to a new screen can be driven by a water pressure differential across the device, such that when a screen reaches a certain saturation point in terms of accumulated sediments, it is switched for a screen that is not fouled by sediments. In some embodiments, a fouled screen or sand filter can be placed into a flow path of water such that water flows across the sand filter or screen in an opposite direction from that of the original flow across the screen, thus dislodging sediments to a waste pathway or drain. Accordingly the systems disclosed herein contemplate use of conventional as well as self-cleaning sediment traps.

The preheat function of the water purification and desalination system preferably involves a preheater 7. However, this function can be performed in numerous different ways, provided that the result is that saline water or seawater flowing into the system arrives at the degasser 8 at a temperature of about 90° C. or more. Accordingly, the preheat function can be embodied in numerous different forms, including, for example, a cylindrical tank, a rectangular tank, or different configurations of any sort with a design permitting a high ratio of surface area to internal volume, and the like.

In preferred embodiments, such as illustrated by FIGS. 9, 10, and 11, the preheater is heated by a plurality of heat pipes 10 that penetrate the preheater through the bottom. These heat pipes transfer the heat of condensation from a condenser into the incoming seawater or saline water. As seawater or saline water enters the preheater 7 through orifice 71, the incoming water is gradually heated to near boiling temperature by the heat pipes 10 as water flows in a spiral pattern imposed by spiral vanes on the bottom of the preheater. As the incoming seawater or saline water reaches near boiling temperature close to the upper center of the preheater, it exits the preheater through tube 82 and enters near the top of the degasser 8. The dimensions and configuration of the preheater are such as to allow for sufficient residence time to elevate the temperature of the water in the preheater to about 90° C. or more. Depending upon the scale of the system, and the capacity of the system for throughput of water, the pre-heating function can benefit from materials and configurations that permit efficient heat exchange. Alternatively, in some embodiments, durability of construction, space considerations, ease of maintenance, availability or expense of materials, as well as other considerations can affect the design choices in this aspect of the invention.

In some embodiments, the system can beneficially function under nonstandard environmental conditions such as, for example, high altitude. At high altitudes, the boiling point of water, including saline water or seawater is less than 100° C., and thus with normal rates of application of heat to the evaporation chamber will generate a greater amount of steam and will permit a higher quantitative throughput in the system. In such embodiments, it is evident that preheat temperatures may also be affected. Given lower evaporation chamber temperatures and lower condenser temperatures, preheating to a desired temperature can be achieved by permitting longer residence time of water in the preheater such as, for example, by configuring the preheater to have a greater volume with an identical flow rate, or a lower flow rate with an identical volume. However, due to elevated levels of steam generation in the evaporation chamber, in most embodiments, adjusting downward the flow rate in the preheat tube to achieve beneficial residence times and desirable preheat temperatures, would be disfavored. This is because the greater rate of steam generation implies a concomitant higher demand for inlet water.

Degassing is accomplished by steam stripping as illustrated by FIGS. 12 and 13. A key factor in degasser performance is mass transfer ratio: the mass of water going downward in a vertical degasser as compared to the mass of steam going upward. Indeed, degassing function can be accomplished with various configurations that permit mass-transfer counterflow of water with a gas. In a preferred embodiment, the gas is steam; in others the gas can be air, nitrogen, and the like. The velocity and activity of mixing of water with steam is affected by the size, conformation, and packing of the degasser column medium, as well as the void volume between the particles of the medium. In preferred embodiments, the particles of the medium pack to form a spiral. The performance of the degasser is affected by the velocity and volume of steam and water passing therethrough; these can be controlled by such factors as the size of the steam inlet and outlet orifice, water flow rate, and the like. Useful information relating to degasser function and design is provided in Williams, Robert The Geometrical Foundation of Natural Structure: A Source Book of Design, New York: Dover, 1979, which is incorporated herein by reference in its entirety.

Control of inlet water flow rate, avoidance of large steam bubbles in the degasser, and the like, can therefore aid efficient function of the degasser. When these parameters are not within a desirable range, flooding or jetting can occur in the degasser. Flooding of inlet water forms a water plug in the degasser and jetting shoots water out of the degasser with the steam, either of which can interfere with degasser performance. It is therefore desirable to operate in a zone that minimizes flooding and jetting and that has a good balance between water influx and steam efflux. The degasser of embodiments of the present invention is particularly important in that it is not designed to remove strictly one contaminant as many conventional degassers are. Instead it removes a variety of contaminants very effectively. In typical settings, where the inlet water has a contaminant at, for example, 1 ppm the process seeks to achieve reduction to 50, 40, 10, 5, 2, or 1 ppb.

Degassing water is normally achieved by heating the incoming water to increase the vapor pressure of volatile compounds. At the boiling point of each compound, the solubility of the dissolved gas drops to zero and the gas will then exit the water. For example, many of the volatile substances found in drinking water are chlorinated compounds that normally have very large partial pressures at temperatures well below the boiling point of water. Thus, many of these substances can be removed from water by heating the water to temperatures of about 200-210° F. (93-99° C.) to effect proper degassing. However, the substances do not completely leave the water immediately; thus, it takes some period of time to completely remove the dissolved gases.

One difficulty with previous degasser designs is that they have little control of the residence time of the heated water in the degasser. Consequently, when excessive amounts of volatile substances are present in the incoming water, there may not be sufficient residence time provided to effect degassing of all the volatile substances. Additionally, many degassers operate in the absence of pressure controls, which can lead to excessive loss of water vapor, when water vapor is the medium selected for effecting mass transfer of the volatile components out of the system.

Another issue in degasser design is scalability. While large industrial degassers operate with substantial pressure drops and large volumes of both liquid and gases that are effective for mass transfer and, thus, degassing, small degassers do not scale down well. What is needed is a more compact degasser that allows for additional residence time and that is also capable of limiting the amount of wasted steam.

In some embodiments, a degasser is provided, which has concentric layers of particles, where an inner layer of particles is configured to result in comparatively small spaces between the particles, and where an outer layer of particles is configured to result in comparatively larger spaces between the particles. In various embodiments, the particles exhibit random and structured packing in the degasser. The particles can be made of a material such as, metal, glass, and plastic. The degasser can have a water entrance at the top. The degasser can have a waste steam exit at the top, and have a heated steam entrance and water exit at the bottom.

In some embodiments, a degasser apparatus is provided that has a container that holds concentric layers of particles, where an inner layer of particles is configured to result in small spaces between the particles, where a middle layer of particles is configured to result in medium spaces between the particles, and where an outer layer of particles is configured to result in larger spaces between the particles. The medium spaces are such that water vapor in the system begins to condense out of the gas phase, and the small spaces are small enough that this process continues so that water vapor is transformed into liquid water.

In other embodiments, the degasser container has a steam entrance at the bottom outer periphery of the container. The steam entrance allows heating steam from a evaporation chamber to enter the container at the outer periphery and heat the outer periphery of the inside of the degasser. The container has a steam exit at the top of the container where waste steam exits the system. The container has a water entrance at the top of the container. The container has a purified water exit at the bottom of the container. The water exit is located, for example, in the center bottom of the container. The container is filled with particles. There are, in some embodiments, three sizes of particles and each particle of a given size is located in a concentric zone; thus, in such embodiments, there are three concentric zones, each having a particle of a given size. In a preferred embodiment, the particles are glass beads. In a more preferred embodiment, there are three sizes of particles with the largest sized particle in an outermost zone of the container and the smallest sized particle in an innermost zone of the container.

Some embodiments include a compact, more effective, degasser. The degasser preferably employs concentric layers of varying porosity so that a zone is created in the degasser that allows steam to pass and another zone is created that promotes water vapor condensation. The degasser includes particles inside the degasser that add surface area to the inside of the degasser, thereby allowing for a greater residence time for the water to be purified.

In some embodiments, the porosity of the system is achieved through differently sized particles. In these embodiments, the particles in the outer layer have a relatively large size so that heating steam can more readily pass from a source of steam, such as an evaporation chamber, into and throughout the degasser. This heating steam, coming from the evaporation chamber, can also act as an insulator to keep the inside temperature of the system near the boiling point. Inside the outer layer of larger sized particles is a layer of medium sized particles. This layer of medium sized particles provides for adequate permeability and long residence time, allowing for a higher percentage of the volatile substances to be degassed. This medium sized layer of pores and particles is more likely to condense water from the steam, as there is less space between the particles. The inner layer includes smaller sized particles, so that the pores are mostly filled with degassed water, which flows, by gravity, into the evaporation chamber.

The degasser system is preferably located in close proximity to the evaporation chamber apparatus. Preferably, the degasser unit is located on the top of an evaporation chamber. This allows steam from the evaporation chamber to rise directly from the evaporation chamber into the degasser. This also allows the degassed water from the degasser to drain straight into the evaporation chamber. As will be appreciated by one of skill in the art, there need not be any significant separation between the evaporation chamber and the degasser. In one embodiment, only a screen, to retain the particles, separates the degasser from the evaporation chamber.

The particles can be of any shape, for example, spherical, semi-spherical, amorphous, rectangular, oblong, square, rounded, polyhedral, irregular (such as gravel, for example), and the like. The particle surface can be varied as desired, such as, for example, solid, porous, semi-porous, coated, or structured to provide large residence time, and the like. Preferably, the particles are spherical and nonporous. One of skill in the art will appreciate that the differently sized particles will have differently sized spaces between them (interstitial spaces). For example, larger glass spheres will have larger spaces than smaller glass spheres. The size of the interparticle space can vary based on the size of the particles, the shape of the particles, and other factors. As a general rule, generally spherical particles that are larger will also result in a mixture with larger porosity. That is, there will be relatively large spaces between the spheres. Likewise, particles that are smaller will have smaller interstitial spaces, resulting in an environment that is more likely to condense steam into liquid water.

The particles can be made of any suitable material. Exemplary materials include but are not limited to metal, glass, composites, ceramics, plastics, stone, cellulosic materials, fibrous materials and the like. A mixture of materials can be used if desired. One of skill in the art will be able to determine a suitable material for each specific purpose. Preferably, the material is made of glass. The chosen material will preferable be capable of standing up to long term high temperature use without significant cracking, breaking, other damage, or leaching toxic materials into the water. If desired, the differently sized particles can be made of different materials. For example, the outer particles can be made of metal, the middle layer of temperature resistant plastic, and the center layer of glass. The chosen material can preferably be resistant to breakage, rust, or cracking due to the heating process.

In some embodiments, rather than altering the size of the particles, other properties of the particles are altered, such as the surface properties of the particles. Further, if desired, the degasser can be packed with a mixture of differently sized particles, where the packing procedure is performed so as to allow a progressively smaller particle size to fill the center regions of the degasser. In some embodiments, the layers are packed with particles that are homogeneous throughout the layer. In other embodiments, the layers are heterogeneous and can contain other shaped beads, particles, glass wool, etc. Heterogeneity of the particles can include not only size but also, for example, composition, surface characteristics, density, specific heat, wettability (hydrophobicity versus hydrophilicity), hardness, ductility, and the like. Preferably, as discussed above, the heterogeneity in whatever form it takes is distributed in concentric rings within the degasser, although other arrangements that are not concentric are also contemplated in some embodiments of the invention.

Examples of volatile contaminants that can be removed or lessened by treatment of water with the method of the present invention include but are not limited to, methyl tertiary butyl ether, benzene, carbon tetrachloride, chlorobenzene, o-dichlorobenzene, p-dichlorobenzene, 1,1-dichloroethylene, cis-1,2-dichloroethylene trans-1,2-dichloroethylene, dichloromethane, 1,2-dichloroethane, 1,2-dichloropropane, ethylbenzene, styrene, tetrachloroethylene, 1,2,4-trichlorobenzene, 1,1,1,-trichloroethane, 1,1,2-trichloroethane, trichloroethylene, toluene, vinyl chloride, xylenes, natural gases, such as oxygen, nitrogen, carbon dioxide, chlorine, bromine, fluorine, and hydrogen, other volatile organic compounds (VOCs), such as formic acid, ethyl hydrazine, methyl methacrylate, butyl ethyl amine, butanol, propanol, acetaldehyde, acetonitrile, butyl amine, ethyl amine, ethanol, methanol, acetone, allyl amine, allyl alcohol, methyl acetate, ammonium hydroxide, and ammonia, and the like.

As illustrated by FIGS. 7A and 7B, once the incoming saline water or seawater has been degassed, it flows by gravity into a lower evaporation chamber 3. This boiling tank can be of essentially any size and configuration depending upon the desired throughput of the system and other design choices made based upon the factors affecting system design. For example, the evaporation chamber can have a volume capacity of about 100 gallon or 2,000-10,000 gallons, 11,000-100,000 gallons, or more. Because the system of the invention is completely scalable, the size of the evaporation chamber is variable and can be selected as desired. Likewise, the configuration of the evaporation chamber can be varied as desired. For example, the evaporation chamber can be cylindrical, spherical, rectangular, or any other shape. In a preferred embodiment, the evaporation chamber 3 is cylindrical, is perforated by a plurality of heat pipes 10 through the bottom of the evaporation chamber, has a centrally positioned discharge tube 21 that carries excess hot saline water down into a lower evaporation chamber, and has a demister 9 mounted on top of the evaporation chamber. In this preferred configuration, the waste stream 11 that carries volatile constituents from the degasser top also traverses the evaporation chamber vertically. Clean steam 91 from the demister flows upward into an upper condenser 4.

Because the operation of the purification system is continuous, saline water or seawater is partially concentrated by boiling, and the degree of concentration in evaporation chamber 3 is determined by the number of distillation stages. Thus, if two stages of distillation are being used, the degree of salinity in the evaporation chamber is kept at half the value of the waste brine to be rejected, or about 12%. If three stages of distillation are used, the degree of salinity in evaporation chamber 3 is allowed to reach about one third of the final brine concentration of about 23%.

In a preferred embodiment, the evaporation chamber drains by gravity only, through drain tube 21. In other embodiments draining the evaporation chamber is driven by pumping action. Continuous draining of the evaporation chamber 3 maintains a constant level of boiling fluid in the chamber, and such continuous drainage also avoids the settling of sediments, salts, and other particulates in the evaporation chamber.

FIG. 18 illustrates the self-cleaning mechanism that prevents scale deposition in the evaporation chamber. Scale tends to form preferentially at the hotter surfaces which, in the case of evaporation chamber 3, correspond to the top surfaces of each heat pipe 10. In a preferred embodiment, the heat pipes are surrounded by a perforated cylinder 27 and a plurality of ceramic balls 28. The self-cleaning medium can be selected from any of a number of suitable alternatives. Such alternatives include glass or ceramic beads or balls, stones, synthetic structures of any of a variety of shapes, and the like. In every case, the properties of the self-cleaning medium will be selected such that agitation by boiling water will displace individual particles of the self-cleaning medium, but that such displacement will be overcome by the physical properties of the self-cleaning medium causing each particle to fall again to the side of each heat pipe and to the bottom of the evaporation chamber, striking and dislodging any deposits or scale. For example, a self-cleaning medium with a relatively high specific gravity but with a relatively small surface to volume ratio may function in a way that is roughly comparable to a second self-cleaning medium with a lower specific gravity but a relatively higher surface to volume ratio. In each case, a skilled artisan is able to select the combination of morphology, and composition to achieve the desired result. In some embodiments, an alternative approach to self-cleaning is employed, such as, for example, application of ultrasonic energy.

Another consideration in the design choice of the self-cleaning medium is the hardness thereof. In general, the hardness should be roughly comparable to the hardness of the material of which the evaporation chamber is composed. This permits continued use of the self-cleaning medium over long periods of time without significant erosion of the medium or of the walls or bottom of the evaporation chamber. In some embodiments, in which the heating element of the evaporation chamber is internal to the chamber, such as the case with heat pipes 10, hardness and other properties of the self-cleaning medium can be selected so as to avoid erosion and/or other damage to the heating element as well as to the evaporation chamber itself.

Because of the self-cleaning function provided by the structure of the evaporation chamber and the evaporation chamber cleaning medium, the system of embodiments of the invention does not require cleaning during its normal life span of use. In some embodiments no cleaning is required for 2, 3, 4, 5 or 6 months. In other embodiments, no cleaning is required for 9, 12, 18, 24, 30, or 36 months. In other embodiments, no cleaning is required for 4, 5, 6, 7, 8, 9, 10 years, or more.

The residence time of water in the evaporation chamber can vary within a range based upon the nature of the inlet water and the desired performance of the system. The suitable range is determined by various factors, including whether biological contaminants are in the input water. Effective removal of biological contaminants can require a variable amount of time being exposed to the high temperatures in the evaporation chamber. Some biological contaminants are more quickly susceptible to high heat than are others. In many embodiments, a residence time as short as 10 minutes is sufficient to kill most biological contaminants. In other embodiments, longer residence times may be desired in order to more thoroughly eliminate a broader spectrum of biological contaminants. The upper end of the range of residence time in the evaporation chamber is typically dictated by efficiency considerations relating to the desired rate of generation of product water in comparison with the energy required to maintain a selected volume of water at boiling temperature. Accordingly, residence time in the evaporation chamber can be as little as the minimal time required for water to reach boiling point and evolve as steam, to time points beneficial to removal of biological contaminants such as, for example, 10, 15, 20, 25, 30, 35, 40, 45 minutes and the like and so on. Further, higher residence times such as, for example, 50, 60, 70, 80 and 90 minutes, or more, may be selected in some embodiments.

Steam produced in the evaporation chamber is generally free of particulates, sediments, and other contaminants. However, boiling action can cause certain contaminants to be carried into the vapor phase, for example on the surface of microdroplets of mist formed at the air/water interface. In addition, steam can condense into droplets on the underside of the evaporation chamber top, as illustrated in FIG. 14. Such droplets 14 can migrate laterally and can enter the demister device 9 with the flow of steam. A metal groove 13 prevents such droplets from migrating and contaminating the steam flow. In addition, a baffle guard 15 may also provide a barrier to mist particles being carried by the steam. FIG. 15 provides a picture of a baffle guard mounted on the underside of a evaporation chamber.

In addition to the above steam cleaning mechanisms, clean steam can be separated from such contaminant-laden mist with use of a demister. Various kinds of demisters are known in the known in the art, including those employing screens, baffles, and the like, to separate steam from mist based upon size and mobility. Preferred demisters are those that employ cyclonic action to separate steam from mist based upon differential density. Cyclones work on the principle of moving a fluid or gas at high velocities in a radial motion, exerting centrifugal force on the components of the fluid or gas. Conventional cyclones have a conical section that in some cases can aid in the angular acceleration. Key parameters controlling the efficiency of the cyclone separation are the size of the steam inlet, the size of the two outlets, for clean steam and for contaminant-laden mist, and the pressure differential between the entry point and the outlet points.

As illustrated by FIGS. 3 and 16, the demister is typically positioned within or above the evaporation chamber 1 or 3, permitting steam from the chamber to enter the demister through an inlet orifice 92. Steam entering a demister through such an orifice has an initial velocity that is primarily a function of the pressure differential between the evaporation chamber and the demister, and the configuration of the orifice. Typically, the pressure differential across the demister is about 0.5 to 10 column inches of water—about 125 to 2500 Pa. The inlet orifice is generally designed to not provide significant resistance to entry of steam into the cyclone. At high velocities, such as in the cyclone cone area 93, the clean steam, relatively much less dense than the mist, migrates toward the center of the cyclone, while the mist moves toward the periphery. A clean steam outlet 91 positioned in the center of the cyclone provides an exit point for the clean steam, while a mist outlet 94 positioned near the bottom of the cyclone permits efflux of mist from the demister. Clean steam passes from the demister to a condenser, while mist is directed to again enter the evaporation chamber. In typical operation, clean steam to mist ratios are at least about 2:1; more commonly 3:1, 4:1, 5:1, or 6:1; preferably 7:1, 8:1, 9:1, or 10:1, and most preferably greater than 10:1. Demister selectivity can be adjusted based upon several factors including, for example, position and size of the clean steam exit opening, pressure differential across the demister, configuration and dimensions of the demister, and the like. Further information regarding demister design is provided in U.S. Provisional Patent Application No. 60/697,107 entitled, IMPROVED CYCLONE DEMISTER, filed Jul. 6, 2005, which is incorporated herein by reference in its entirety. The demisters disclosed herein are extremely efficient in removal of submicron-level contaminants. In contrast, demisters of other designs such as, for example, screen-type and baffle-type demisters, are much less effective at removing submicron-level contaminants.

Clean steam is condensed in a condenser typically positioned directly above each evaporation chamber. Excess heat can be exhausted by a heat sink, a fan, a heat exchanger, or a heat pipe. In a preferred embodiment, heat is removed from the condenser by heat pipes, as illustrated by FIGS. 5, 6 and 8. A discussion of heat pipes for transferring heat from condensing steam to inlet water is provided in U.S. Provisional Patent Application No. 60/727,106, entitled ENERGY-EFFICIENT DISTILLATION SYSTEM, filed Oct. 14, 2005, and U.S. patent application Ser. No. 12/090,248, also entitled ENERGY-EFFICIENT DISTILLATION SYSTEM, filed Sep. 9, 2008 and published as U.S. Patent Application Publication No. 2009/0218210, both of which are incorporated herein by reference in their entirety.

Clean steam enters the condenser 2 or 4 or 6 via tube 91 from the demister. As it enters the condenser, the steam rotates in a spiral fashion which increases residence time and render condensation most effective. The spiral motion of the steam in the condenser is effected by spiral vanes. Heat of condensation is removed by a plurality of heat pipes 10, mounted on the upper surface of the condenser. As heat is removed by the heat pipes and transferred upward to an upper evaporation chamber or preheater, steam condenses into product water that exists through a clean water outlet 24. Both waste steam tube 11 and the brine overflow tube 21 that carries hot brine from an upper evaporation chamber to a lower one, traverse the condenser.

FIGS. 2 and 3 illustrate a preferred configuration of the bottom evaporation chamber and the heating system. Intermediate boiling and condensers as may be employed in multiple distillation stages are entirely similar to those described above and are not repeated. The bottom evaporation chamber 1 represents the last stage of saline concentration by evaporation, and waste brine concentration from this stage is at or below about 23% salt, so as to prevent crystallization at any point in the system. Hot saline brine enters the bottom evaporation chamber 1 through tube 21 which causes a hydraulic over-pressure of several inches of water, or sufficient to maintain boiling temperatures that are 5-25 C higher than the topmost evaporation chamber, thus ensuring efficient heat transfer between various distillation stages. Another tube placed inside the evaporation chamber and connected to the waste drain stream 11 maintains a constant level of boiling brine in the evaporation chamber, and continuously removes waste brine and any particulates in suspension. Steam produced in the evaporation chamber enters demister 9 where it is cleaned.

Energy for distillation is provided by a heater tank 21 positioned at the bottom of evaporation chamber 1. FIG. 4 illustrates various different configurations for providing heat. FIG. 4(a) illustrates the fact that the subject of this invention is energy agnostic. The proposed system for desalination can use any form of energy as energy source 211, including electricity, natural gas, oil or hydrocarbons, or even waste heat sources, as long as they deliver heat at temperatures higher than 120-130 C. FIG. 4(b) illustrates the simplest configuration, consisting of either an oil or a gas burner 212. FIG. 4(c) depicts an electric heater, provided with power supply 216 and resistive heater 213. FIG. 4(d) illustrates resistive heating, using resistive heaters 213 surrounded by an insulating sleeve 214 and connected to a power source 216, of heat pipes 215 that subsequently transfer the heat into a evaporation chamber. And FIG. 4(e) illustrates the utilization of waste heat 217 by using heat pipes 215.

FIG. 17 illustrates the principle of operation of conventional heat pipes. A heat pipe consists of a sealed tube 17 under partial vacuum, partially filled with a small volume of working fluid 18, which typically may be water, and also filled with a capillary wick 19. A heat source 25 provides energy in the form of enthalpy to one end of the heat pipe, and that energy causes the evaporation of the working fluid 18. The vapor of the working fluid immediately fills the tube because it is under partial vacuum. As soon as the working fluid vapor reaches the opposite end of the heat pipe, which is at slightly lower temperature, it condenses and provides the same enthalpy back in the from of heat of condensation. As the working fluid condenses into a liquid, it is adsorbed by the capillary wick which carries it back to the starting point. Because the heat of evaporation is, by definition, equal to the heat of condensation, a heat pipe transfers heat very efficiently without appreciable losses in temperature, other than heat losses through the wall.

FIG. 19 illustrates a preferred configuration for attaching heat pipes to evaporation chamber 3 and condenser 2, so as to prevent leakage. A circular sleeve 36 is either welded or otherwise attached to the heat pipe 10. A smaller diameter sleeve is welded or otherwise attached to the evaporation chamber bottom 26 or the upper condenser top 37. Screws 34 attach these sleeves under pressure so as to compress O-ring 33.

The materials of construction for the evaporation chambers and preheaters can be any material that resists corrosion in saline environments. In a preferred embodiment, the evaporation chambers and preheaters are manufactured using a titanium alloy, such as Ti-6A1-4V, which is known to resist corrosion of hot seawater. Alternatively, conventional carbon steel may be used when coated with specific chlorofluorocarbon polymers (e.g., Teflon®), or a variety of polymer materials that resist boiling temperatures and saline environments. These materials of construction are exemplary and are not intended as limitations on the scope of the invention. Those skilled in the art may consider alternative materials and coatings, such as other metals and alloys, which are encompassed within the spirit of the invention and are defined by the scope of the disclosure.

In some embodiments, the system for purifying water, embodiments of which are disclosed herein, can be combined with other systems and devices to provide further beneficial features. For example, the system can be used in conjunction with any of the devices or methods disclosed in U.S. Provisional Patent Application No. 60/676,870 entitled, SOLAR ALIGNMENT DEVICE, filed May 2, 2005; U.S. Provisional Patent Application No. 60/697,104 entitled, VISUAL WATER FLOW INDICATOR, filed Jul. 6, 2005; U.S. Provisional Patent Application No. 60/697,106 entitled, APPARATUS FOR RESTORING THE MINERAL CONTENT OF DRINKING WATER, filed Jul. 6, 2005; U.S. Provisional Patent Application No. 60/697,107 entitled, IMPROVED CYCLONE DEMISTER, filed Jul. 6, 2005; PCT Application No: US2004/039993, filed Dec. 1, 2004; PCT Application No: US2004/039991, filed Dec. 1, 2004; PCT Application No US06/40103, filed Oct. 13, 2006, PCT Application No: US06/40553, filed Oct. 16, 2006; PCT Application No. US2007/005270, filed Mar. 2, 2007, PCT Application No. US2008/003744, filed Mar. 21, 2008, and U.S. Provisional Patent Application No. 60/526,580, filed Dec. 2, 2003; each of the foregoing applications is hereby incorporated by reference in its entirety.

One skilled in the art will appreciate that these methods and devices are and may be adapted to carry out the objects and obtain the ends and advantages mentioned, as well as various other advantages and benefits. The methods, procedures, and devices described herein are presently representative of preferred embodiments and are exemplary and are not intended as limitations on the scope of the invention. Changes therein and other uses will occur to those skilled in the art which are encompassed within the spirit of the invention and are defined by the scope of the disclosure.

Control Instrumentation

This discussion is aided by reference to FIG. 20. When the main power switch is energized, the control circuitry determines start-up procedures and, subsequently, continuous operation. Initially, power is delivered to the intake pump that begins to feed water to the entire system at a constant flow rate. The user inputs include "start," "pause/hold," and maintenance mode, and the user status can show the operating mode and sensor status either via a display, a remote terminal, or via the Internet. A temperature sensor at the upper evaporation chamber detects temperatures lower than the boiling point of water and that activates a solenoid valve that diverts the output of all condensers to a waste drain. The sensor inputs include one or more of evaporation chamber temperature, degasser temperature, demister temperature, inlet water turbidity (total dissolved solids), outlet water turbidity (total dissolved solids), and water overflow. Simultaneously, the same temperature sensor activates an energy input switch that activates energy input into the heater chamber. Depending on whether the heater system operates with electricity, gas, oil, or waste heat, the input switch turns on power to the electric coils, turns on fuel supply and ignites burners, or switches on a waste heat supply, respectively.

As the system comes up to temperature, the sensor in the upper evaporation chamber reaches boiling temperature, at which point it activates a solenoid valve that closes the drainage of all condensers and allows the delivery of product water.

The control circuitry includes a number of safety features, all of which turn power off the system while activating a warning light or audible signal. Conductivity sensors located at the product outlet continuously monitor water quality, and turn off the system if such quality deteriorates past a predetermined point. Specifically, the operation states include water quality alert, water quality error, and operating modes such as startup, normal, maintenance, and off; external system control may be enabled by source water flow or evaporation chamber heat. Similarly, a temperature sensor at the heating chamber prevents overheating of the system. A conductivity probe located at the waste drain stream measures the concentration of the waste brine and shuts off the system if such concentration exceeds 23% salt so as to prevent crystallization problems inside the system. The desalination control can be enabled by inlet flow control or by evaporation chamber drain.

It will be apparent to one skilled in the art that varying substitutions and modifications can be made to the invention disclosed herein without departing from the scope and spirit of the invention.

Those skilled in the art recognize that the aspects and embodiments of the invention set forth herein can be practiced separate from each other or in conjunction with each other. Therefore, combinations of separate embodiments are within the scope of the invention as disclosed herein.

All patents and publications are herein incorporated by reference to the same extent as if each individual publication was specifically and individually indicated to be incorporated by reference.

The invention illustratively described herein suitably can be practiced in the absence of any element or elements, limitation or limitations which is not specifically disclosed herein. The terms and expressions which have been employed are used as terms of description and not of limitation, and there is no intention that in the use of such terms and expressions indicates the exclusion of equivalents of the features shown and described or portions thereof. It is recognized that various modifications are possible within the scope of the invention disclosed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the disclosure.

What is claimed is:

1. A water purification and desalination system comprising a plurality of fluid-process components, heat-transfer components, and a control system, wherein:
   the fluid-process components define a fluid-process pathway of fluid flow from a water inlet to outlets for products and for waste, and wherein each component along the fluid-process pathway is in fluid communication with adjacent fluid-process components, and wherein the fluid process components comprise, in order of fluid flow: a water inlet, a preheater, a degasser, an evaporation chamber, a demister, a product condenser, and said outlets;
   such that, in operation,
   the degasser removes organics, volatiles, and gasses from the water using steam from the evaporation chamber;
   the evaporation chamber collects water from the degasser and sends steam to the demister;
   the demister separates clean steam from waste steam and sends clean steam to the product condenser;
   the degasser and demister work in cooperation to remove from a contaminated water sample at least one contaminant selected from the group consisting of microbiological contaminants, radiological contaminants, metals, salts, and organics;
   the product condenser yields purified water with levels of all contaminants below the levels shown in the MCL Column of Table 1, when the contaminated water has levels of the contaminants that are up to 25 times greater than the levels shown in the MCL Column of Table 1;
   the heat-transfer components provide distillation energy from a source selected from the group consisting of electricity, waste heat, and combustion, of oil, hydrocarbons, or natural gas; and
   and wherein the heat transfer components comprise heat pipes in contact with at least the product condenser and/or the evaporation chamber, and wherein the heat transfer components define a heat-cycling and recovery pathway to permit heat from the product condenser to be cycled back to the preheater and/or to the evaporation chamber;
   and wherein the control system permits continuous purification and desalination of inlet water without requiring user intervention or cleaning;
   and wherein the fluid process removes, from a contaminated water sample, at least one contaminant selected from the group consisting of microbiological contaminants, radiological contaminants, metals, salts, and organics.

2. The system of claim 1, wherein the volume of purified water produced is between 20% and 95% of a volume of input water.

3. The system of claim 1, wherein the system does not require cleaning through at least two months of use.

4. The system of claim 1, wherein the system does not require cleaning through at least one year of use or longer.

5. The system of claim 1, further comprising an inlet switch to regulate flow of water through the inlet.

6. The system of claim 5, wherein the inlet switch comprises a mechanism selected from the group consisting of a solenoid, a valve, and an aperture.

7. The system of claim 5, wherein the inlet switch is controlled by the control system.

8. The system of claim 5, wherein the control system controls the switch based upon feedback from the purification system.

9. The system of claim 8, wherein the feedback is based upon at least one characteristic selected from the group consisting of: amount of water in a product water container, flow of product water through the product outlet, time of water flow, time of no water flow, amount of water in the evaporation chamber, detection of a leak, evaporation chamber pressure, output water quality as determined by measuring total dissolved solids, pressure differential across the evaporation chamber, and movement of water across an evaporation chamber overflow weir float.

10. The system of claim 1, further comprising a shutdown control.

11. The system of claim 10, wherein the shutdown control is selected from the group consisting of a manual control, a flood control, a condenser capacity control, and an evaporation chamber capacity control.

12. The system of claim 11, wherein the control system controls the inlet based upon feedback from at least one of a temperature sensor in an evaporation chamber, a condenser float, and a flood detector.

13. The system of claim 1, further comprising a flow controller.

14. The system of claim 13, wherein the flow controller comprises a pressure regulator.

15. The system of claim 14, wherein the pressure regulator maintains water pressure between 0 kPa and 250 kPa.

16. The system of claim 1, further comprising a sediment trap.

17. The system of claim 1, wherein water exiting the preheater has a temperature of at least 96° C.

18. The system of claim 1, wherein the degasser is in a substantially vertical orientation, having an upper end and a lower end.

19. The system of claim 18, wherein heated water from the preheater enters the degasser proximate to the upper end.

20. A method of using the water purification and desalination system of claim 1 to purify and desalinate water, comprising the steps of:
 providing to the inlet a contaminated water sample comprising at least one contaminant in a first concentration;
 passing the contaminated water sample through the preheater;
 removing from the contaminated water sample at least one contaminant selected from the group consisting of microbiological contaminants, radiological contaminants, metals, salts, and organics by counterflowing the contaminated water sample against an opposite directional flow of a gas in a degasser;
 maintaining the water from which contaminants have been removed in an evaporation chamber for a length of time under conditions permitting formation of steam;
 discharging steam from the evaporation chamber to a demister;
 separating clean steam from contaminant-containing waste in the demister;
 condensing the clean steam in a condenser to yield purified water; and
 recovering and transferring heat from the condenser into an upper evaporation chamber or preheater.

* * * * *